(12) United States Patent
Koch et al.

(10) Patent No.: US 8,596,316 B2
(45) Date of Patent: Dec. 3, 2013

(54) COUPLING CLOSURE, AND DOCKING DEVICE COMPRISING TWO OF SAID COUPLING CLOSURES

(75) Inventors: Martin Koch, Neuenburg-Grissheim (DE); Peter Lais, Muellheim (DE); Gunter Philipp, Muellheim (DE); Joachim Stoye, Neuenburg-Grissheim (DE)

(73) Assignee: GEA Pharma Systems AG, Bubendorf (CH)

( * ) Notice: Subject to any disclaimer, the term of this patent is extended or adjusted under 35 U.S.C. 154(b) by 963 days.

(21) Appl. No.: 12/519,363

(22) PCT Filed: Dec. 13, 2007

(86) PCT No.: PCT/DE2007/002259
§ 371 (c)(1),
(2), (4) Date: Jan. 15, 2010

(87) PCT Pub. No.: WO2008/071181
PCT Pub. Date: Jun. 19, 2008

(65) Prior Publication Data
US 2010/0126622 A1    May 27, 2010

(30) Foreign Application Priority Data

Dec. 15, 2006 (EP) .................................. 06026069
Jan. 19, 2007 (EP) .................................. 07001108

(51) Int. Cl.
*F16L 37/30* (2006.01)
*B65B 1/06* (2006.01)
*B65B 3/06* (2006.01)

(52) U.S. Cl.
USPC ...... 141/383; 141/1; 137/614.04; 137/614.06

(58) Field of Classification Search
USPC ......... 141/383–386; 137/614, 614.01–614.06
See application file for complete search history.

(56) References Cited

U.S. PATENT DOCUMENTS 5,295,507 A * 3/1994 Bandy et al. ............. 137/614.06
5,540,266 A     7/1996 Grau
(Continued)

FOREIGN PATENT DOCUMENTS

CH    695425 A5    5/2006
DE    4342962 C1    2/1995
(Continued)

OTHER PUBLICATIONS

Machine translation of EP1749770; Feb. 7, 2007; all pages.*
(Continued)

*Primary Examiner* — Gregory Huson
*Assistant Examiner* — Nicolas A Arnett
(74) *Attorney, Agent, or Firm* — Christensen O'Connor Johnson Kindness PLLC

(57) ABSTRACT

The invention relates to a coupling closure for a docking device used for decanting, filling, and/or emptying containers, particularly in an environmentally isolated manner. The coupling closure has a closure side and a container side and comprises a nozzle stub and a cap which is mounted in the nozzle stub so as to be pivotable about an axis and has an external side that faces the closure side in the closed position. The invention further relates to a docking device for decanting, filling, and/or emptying containers, particularly in an environmentally isolated manner. The docking device comprises first and second disclosed coupling closures which can be placed flush against each other by the respective closure sides thereof. The invention also relates to a working platform, a locking unit for a docking device, and a method for decanting, filling, and/or emptying containers, particularly in an environmentally isolated manner.

30 Claims, 12 Drawing Sheets

(56) References Cited

U.S. PATENT DOCUMENTS

Figure 3:
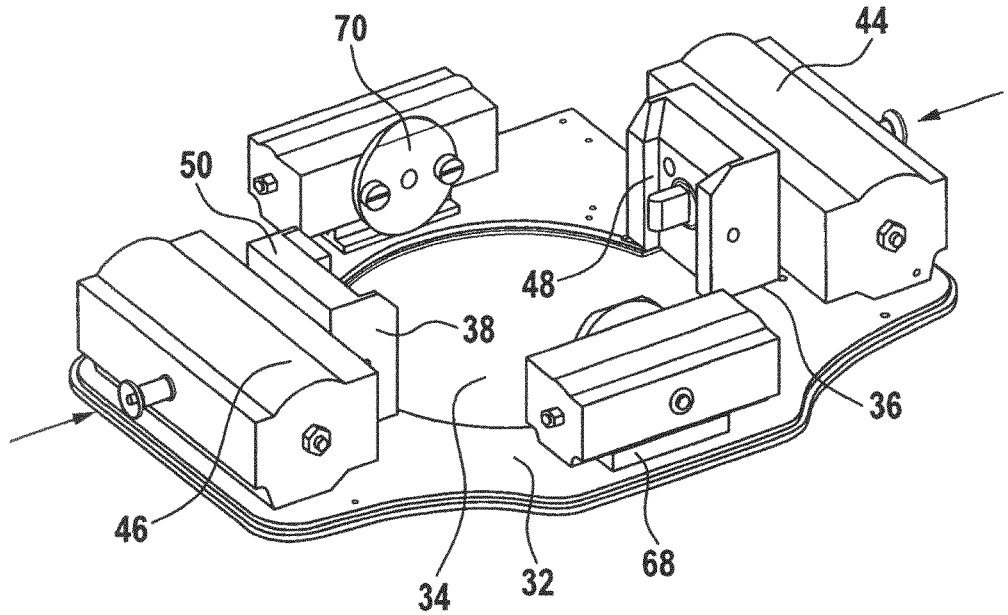

| | | | |
|---|---|---|---|
| 5,718,270 A * | 2/1998 | Grau et al. | 141/383 |
| 5,794,647 A | 8/1998 | Denmark | |
| 5,853,207 A | 12/1998 | Saint Martin | |
| 6,308,749 B1 * | 10/2001 | Brossard et al. | 141/91 |
| 6,315,013 B1 * | 11/2001 | Lardieri | 141/383 |
| 6,357,488 B1 * | 3/2002 | Brossard et al. | 141/1 |
| 6,412,518 B1 * | 7/2002 | Pieri | 137/614.01 |
| 6,789,780 B2 * | 9/2004 | Pieri | 251/175 |
| 6,807,979 B2 * | 10/2004 | Koch et al. | 137/240 |
| 6,913,048 B2 | 7/2005 | Koch | |
| 2002/0158086 A1 * | 10/2002 | Pieri | 222/390 |
| 2004/0094211 A1 * | 5/2004 | Koch et al. | 137/614.06 |
| 2004/0099335 A1 * | 5/2004 | Koch et al. | 141/383 |
| 2011/0088353 A1 * | 4/2011 | Lais et al. | 53/381.1 |

FOREIGN PATENT DOCUMENTS

| | | |
|---|---|---|
| DE | 4415488 C2 | 11/1995 |
| DE | 69504581 T2 | 4/1999 |
| DE | 20014871 U1 | 2/2001 |
| EP | 0 554 096 A1 | 8/1993 |
| EP | 1749770 * | 2/2007 |

OTHER PUBLICATIONS

International Search Report mailed Nov. 4, 2008, in corresponding Application No. PCT/DE2007/002259, filed Dec. 13, 2007, 2 pages.
Japanese Office Action, mailed Apr. 3, 2012, in Japanese Application No. 2009-540598, filed Apr. 22, 2010, 17 pages.
Japanese Office Action Decision of Refusal, mailed Apr. 2, 2013, in Japanese Application No. 2009-540598, filed Apr. 22, 2010, 8 pages.

* cited by examiner

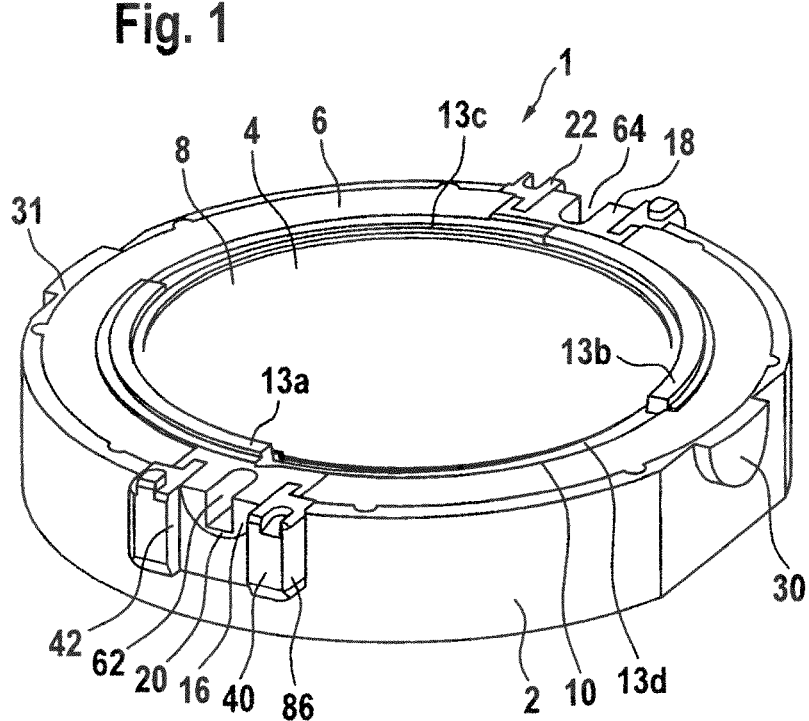
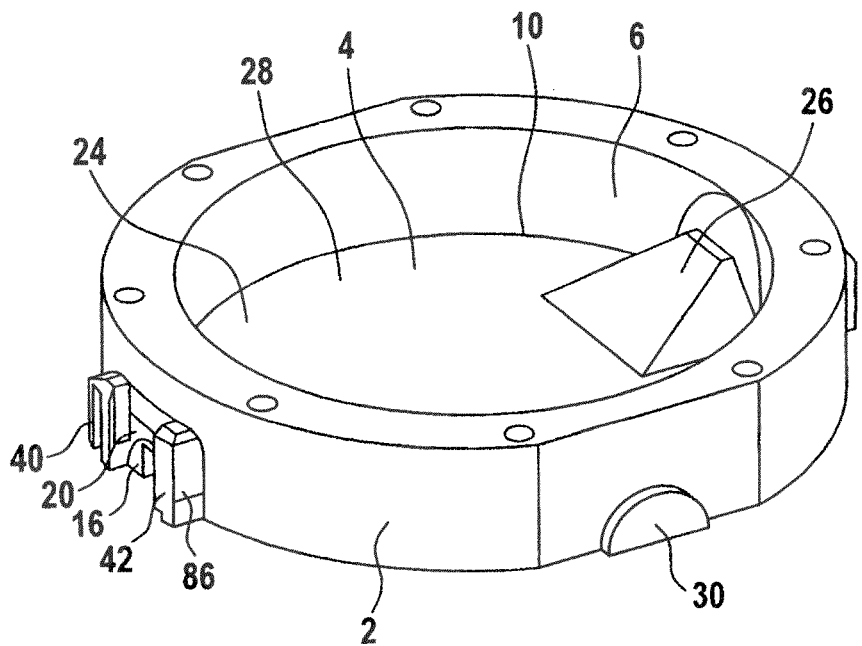

COUPLING CLOSURE, AND DOCKING DEVICE COMPRISING TWO OF SAID COUPLING CLOSURES

The following invention relates to a coupling closure for decanting, filling and/or emptying containers, particularly in an environmentally isolated manner, and to a docking device comprising two coupling closures according to the invention which are, or can be, coupled with one another. Furthermore the invention relates to a working platform for operating the docking device according to the invention as well as a method for decanting, filling and/or emptying containers using the docking device according to the invention.

In many industries, particularly in the processing industry, the requirements on the purity of output products employed are frequently highly demanding, which means that contamination by impurities is to be avoided in any stage of the process and not only in the production and isolation of the output products. However, contact with the environment often cannot be avoided completely when filling the finished output products in suitable trading containers as well as when decanting the same for subsequent processing into intermediate or final products. Already thereby can the quality of the processed products be lastingly affected. It might even occur that product charges have to be rejected completely. On the other hand, particularly in the case of toxic compounds, contacts of these substances with human beings and the environment must be prevented, which likewise requires very careful handling in an environmentally insulating manner. Frequently, only working in extremely clean rooms would meet the requirements for filling toxic substances in suitable processing containers. Anyhow, the efforts made so as not to pollute valuable output products and the goal not to contaminate the environment with toxic compounds require expensive apparatuses and safety precautions, which inevitably is reflected in the manufacturing costs. High demands of contamination-free working are regularly made e.g. by the food-processing industry, the chemical industry or the pharmaceutical industry, for example, if products in the form of bulk material or fluids are to be transferred from a stationary first container to a transportable second container. Since some products already act on the human organism very toxically even in extremely small quantities and other products react very sensitively if exposed, e.g., to air, industry has developed effective coupling elements or docking devices to allow filling or emptying of a container under isolated or at least dust-free conditions.

For the contamination-free transfer of bulk material, systems which make use of the half-flap technology, have been found to work satisfactorily. Such systems are described for example in DE 695 04 581 T2. DE 43 42 962 C1 and DE 44 15 488 C2 describe docking systems with closing flaps the flat sides of which are brought closely together in the inlet and outlet pipe sockets of containers to be coupled and are then pivoted around their own axis from a closed position to a position which releases the passage channel at least partly.

In order to keep the required apparatuses and the costs for the rather expensive equipment, which makes use of the half-flap technology for bulk material transfer, within reasonable bounds, regularly only one of the closing flaps, the so-called active flap, is designed to be pivoted by a drive or manually. The closing flap, the so-called passive flap which is in close contact with the active flap, is carried forward by the movement of the active flap. A disadvantage of such systems is regularly that only a passive flap matching the active flap provides a functional docking system for the contamination-free transfer of bulk material. Accordingly, attention is always to be paid to provide the suitable flap configuration for each container to be used. For example, if either only the passive flap or the active flap is defective or cannot be found, the whole docking system cannot be used any more. A further disadvantage of conventional docking devices on the basis of the half-flap technology consists in lacking flexibility and application friendliness of this system. The constructionally more complex and more cost-intensive active flap of such docking device is attached almost exclusively to a stationary container, which is to be filled or emptied, while the passive flap is mounted to a mobile container or a mobile means of conveyance, for example a hose or a pipe. Bulk material is rarely transferred directly from one container to another through passive and active flaps for lack of practicability.

A further disadvantage of the use of docking devices formed by an active flap and a passive flap can be observed in particular when using closing flaps of large nominal size, for example, within the range of 300-400 mm or larger. When the active flap is pivoted, the torque is transferred to the passive flap regularly at a distance from the common axis of rotation. Frequently, a gap forms then on the opposite side at the circumferential rim of the active flap and the passive flap, through which bulk material can penetrate. When uncoupling, contamination of the environment with bulk material cannot be prevented, unless complex exhaust and/or cleaning devices are used, as disclosed for example in DE 44 15 488 C2 or DE 214 871 U1.

It would therefore be desirable to be able to use docking devices as well as coupling closures forming such docking devices, which are no longer afflicted with the disadvantages of the state of the art. The object of the present invention was therefore to provide coupling closures as well as docking devices, which can be operated reliably even in continuous use, which can be easily handled and which do not imply any restrictions concerning handling range or handling flexibility.

Accordingly, a coupling closure for a docking device with a closing side and a container side was found for decanting, filling and/or emptying containers, particularly in an environmentally isolated manner, comprising a nozzle stub and a closing flap which is pivotable around an axis and which has an external side that faces the closure side in the closed position, wherein at least one side, particularly both sides, of the closing flap is/are arranged on a bearing, which is open towards the closure side in each case, along the axis with a partial shaft or a partial shaft end, wherein the partial shaft(s) or partial shaft end(s) is/are suitable to form, in arrangement with complementary partial shafts and/or partial shaft ends of another coupling closure, a shaft or a shaft end, wherein the partial shaft or the partial shaft end has at least one engaging element, in which a complementary engaging element, which can be brought, or which is, in effective connection with a drive, e.g., via a drive shaft, can be inserted.

The complementary engaging element is designed for the transmission of a torque to the closing flap of the coupling closure and suitable to transmit the rotation of the drive shaft to the closing flap by interaction with the engaging element of the partial shaft or the partial shaft end.

Here, among other things, a design is preferred, in which the partial shaft or partial shaft end has a front end in the axial direction, in or on which the engaging element is present, which can be inserted axially into a complementary engaging element, which can be brought, or which is, in effective connection with a drive.

It can be intended that the closing flap has on its external side at least one sealing section or at least one seal, particularly a circumferential seal, which is arranged, at least in parts, on or close to the circumferential rim.

Here embodiments are advantageous, in which the sealing sections are arranged in segments of a circle and/or rotationally symmetrically and/or which have the same length.

Such coupling closures according to the invention are particularly practicable, in which the closing flap has two sealing sections protruding from its external side, which are formed and dimensioned in such a way that an essentially continuously circumferential seal is obtained by an essentially identical set of sealing sections. Such coupling closures are suitable to form an environmentally tightly sealed docking device according to the invention with identically constructed coupling closures in which a circumferential sealing ring exists between the external sides of the closing flaps of the two coupling closures. The circumferential seal of the docking device is suitably divided into four equally long sealing sections two of which are to be provided by a first coupling closure and the other two being provided by a second coupling closure. The first sealing section of the first coupling closure should appropriately begin near the axis of rotation, i.e., adjacent to a shaft end and extend over an angle of 90° of the circumference. The second sealing section then begins at the axis of rotation of the opposite shaft end and extends again over an angle of 90° of the circumference. Of course it is likewise possible to use two identical coupling closures to form a docking device according to the invention with a circumferential seal on the external side of the closing flap, which protrudes permanently from the external side. Mutual contact of the closing sides of these coupling closures will bring about close contact between these two sealing rings. With such systems the extent of protrusion of the sealing ring from the external side can regularly be less distinctive.

According to the invention it can be further intended that the inner wall of the nozzle stub is fitted with a nozzle stub seal at least in parts, in particular to its full circumference.

A further advantageous embodiment provides that the external side of the closing flap in the closed position can be arranged essentially in alignment with the rim of the nozzle stub or the nozzle stub seal facing the closing side, at least in parts.

In accordance with a further embodiment it can be intended that at least one partial shaft and/or partial shaft end has recesses on the side facing the closing side, at least in parts, for engaging complementary partial shafts and/or partial shaft ends, particularly in the form of a semiaxle, at least in parts.

The bearing(s) is/are preferably formed as half shells open toward the closing strip. Such bearings and/or bearing shells are preferred, which allow interactions of groove and spring with the partial shaft and/or partial shaft end so that this partial shaft or this partial shaft end and the closing flap connected with it are always reliably present in the nozzle stub and will anyhow be linked inseparably to it in type-related wear.

It can be intended in this connection that in the closed position the external side of the closing flap and the side, particularly the flattened side, of the partial shaft or partial shaft end, which does not rest on the bearing, can be, or are, arranged flush with each other, at least in parts.

The engaging element is preferably at least one groove and/or at least one projection, in particular a thorn. The engaging element is generally to be formed in such a manner that it is suitable for load transmission and for pivoting the closing flap.

Of course the coupling closures according to the invention comprise also coupling closures which are already tightly connected to a container or means of conveyance, e.g., a hose or a pipe, particularly by their nozzle stubs. The nozzle stub can just as well be a component of the container or the means of conveyance or even form one piece with this container or this means of conveyance.

Such coupling closures according to the invention are particularly advantageous, wherein the bearing, particularly a set of bearing shells in the nozzle stub, is made, at least in parts, in particular completely, from at least one plastic material, in particular polyamide, polyether ketone (PEK), polyetherether ketone (PEEK), polyetherimide, polybutylene terephthalate (PBT), polyketones, polyimides, polyphenylene ether, polyarylether ketones, polyacrylnitrile, polyvinyl chloride, polyolefins and/or polyoxymethylene. Thus it is possible to make the bearing and/or the bearing shell separately and of a material different from the material of the nozzle stubs. By selecting a plastic material for the bearing or the bearing shell, particularly a non-abrasive plastic material, as mentioned above, it is possible to operate the entire coupling device, and consequently also the docking device formed by two such coupling devices according to the invention, completely without any lubricant. For the permanently contamination-free transfer of sensitive bulk material, in which even smallest impurities, for example, with pharmaceutical preparations, are to be avoided, this aspect is rather important.

In a further embodiment the coupling closures according to the invention have additionally at least one, particularly two, limit stops at the sides of the nozzle stub adjacent to at least one bearing. As the limit stop protrudes from the side wall of the nozzle stub, the partial shaft or partial shaft end can be exactly positioned in front of the drive shaft of a drive in interaction with a guide mechanism. This succeeds particularly well, if the limit stop or the limit stops is/are available in two dimensions for adjustment. On the one hand, the positioning in the axial direction on either side of the opposing partial shafts or partial shaft ends and on the other hand the lateral adjustment in the level of the closing flap in closed position are of advantage in this respect.

In accordance with a further development of the coupling closures according to the invention it can be intended that the engaging element and/or the partial shaft or partial shaft end has at least one partial locking element which is suitable for forming a first locking element with a partial locking element of a corresponding coupling closure. By providing the partial shafts or partial shaft ends or the engaging elements of the coupling closure with partial locking elements it can be ensured already by engaging the engaging elements of two corresponding coupling closures which form a docking device that these or their closing flaps remain tightly locked against each other during the entire bulk material transfer.

Particularly preferably it is here intended that the partial locking element comprises a contact area, at least in parts, which is radial, particularly in relation to the axis of rotation of the closing flap, and which faces the container side, and/or a groove or spring, in the front end of the partial shaft or partial shaft end, at least in parts, which, at least in parts, is particularly radially circumferential and suitable for contacting or receiving a corresponding second locking element thus forming a locking unit. A particularly appropriate arrangement is characterized by the fact that the partial locking element is a component of the engaging element. If the engaging element of the coupling closure is, for example, a groove or a partial groove, the partial locking element can be present therein as a projection, a bulge or a wedge-shaped attachment with a bevelled surface, which force can be exerted on towards the closing side of the coupling closure.

Furthermore, in a particularly appropriate realization of the coupling closures according to the invention, it is intended that the closing flap, via a first partial shaft or a first partial shaft end, which does not have any, or which has at least one, engaging element in which a complementary engaging element, which can be brought, or which is, in effective connection with a drive or which cannot be brought, or which is not, in effective connection with a drive, can be inserted, and/or along the pivotable axis, has a second partial shaft or a second partial shaft end, which does not have, or which has at least, one second engaging element, in which a complementary engaging element, which can be brought, or which is, in effective connection with a drive or which cannot be brought, or which is not, in effective connection with a drive, can be inserted, wherein at least one partial shaft or partial shaft end has at least one engaging element, in which a complementary engaging element, which can be brought, or which is, in effective connection with a drive, can be inserted.

Here it is particularly preferred that at least one partial shaft and/or at least one partial shaft end, particularly all partial shafts or partial shaft ends, is/are connected or present with the closing flap in one piece. A partial shaft and/or a partial shaft end is connected with the closing flap in one piece or is present in one piece in the sense of the present invention, particularly if the partial shaft and/or the partial shaft end cannot be separated from the closing flap nondestructively any longer. This can be the case, for example, if the partial shaft or the partial shaft end are manufactured together with the closing flap in one and the same process, e.g., by casting, or if the partial shaft or the partial shaft end were soldered or welded to the closing flap.

In accordance with a further embodiment it can be intended that the front end of the partial shaft and/or partial shaft end, in or on which the engaging element is present, has essentially a flat form.

The object of the invention is furthermore achieved by a docking device for decanting, filling and/or emptying containers, particularly in an environmentally isolated manner, which comprises via its respective closure sides first and second coupling closures according to the invention, wherein the external sides of the respective closing flaps are, or can be made, tightly fitting to each other and can be pivoted, while tightly fitting to each other, from a closed position, in which they close the transfer channel formed by the nozzle stub of the first coupling closure and the nozzle stub of the second coupling closure, about a common axis to an open position.

In this context it is particularly preferable that at least the nozzle stub, the nozzle stub seal, the closing flap and/or the partial shaft and/or partial shaft end of the first and the second coupling closure, particularly the first and the second coupling closure, are essentially identically constructed.

It can also be intended, among other things, that the nozzle stubs, particularly the nozzle stub seals of the first and the second coupling closure, are aligned with each other when fitting tightly to each other.

Particularly suitable realizations of the docking device according to the invention are characterized by the fact that the first partial shaft or the first partial shaft end of the first coupling closure forms a first shaft or a first shaft end with the complementary first partial shaft or the complementary first partial shaft end of the second coupling closure, wherein the first partial shaft or the first partial shaft end of the first coupling closure does not have any, or has at least one, engaging element, in which a complementary element, which can be brought, or which is, in effective connection with a drive or which cannot be brought, or which is not, in effective connection with a drive, can be inserted, and/or that the first partial shaft or the first partial shaft end of the second coupling closure does not have any, or has at least one, engaging element, in which a complementary engaging element, which can be brought, or which is, in effective connection with a drive or which cannot be brought, or which is not, in effective connection with a drive, can be inserted, and/or that the second partial shaft or the second partial shaft end of the first coupling closure, when in close contact with the complementary second partial shaft or the complementary second partial shaft end of the second coupling closure, forms a shaft or a shaft end, wherein the second partial shaft or the second partial shaft end of the first coupling closure does not have any, or has at least one, engaging element, in which a complementary engaging element, which can be brought, or which is, in effective connection with a drive or which cannot be brought, or which is not, in effective connection with a drive, can be inserted, and/or that the second partial shaft or the second partial shaft end of the second coupling closure does not have any, or has at least one, engaging element, in which the complementary engaging element, which can be brought, or which is, in effective connection with a drive or which cannot brought, or which is not, in effective connection with a drive, can be inserted, wherein at least one first or second partial shaft or at least one first or second partial shaft end has at least one engaging element of the first or the second coupling closure, in which a complementary engaging element, which can be brought, or which is, in effective connection with a drive, can be inserted.

Hereby such embodiments are preferred, in which the engaging elements of the complementary first partial shafts or partial shaft ends of the first and the second coupling closure form a uniform engaging element, particularly a uniform groove or spring, and/or the engaging elements of the complementary second partial shafts or partial shaft ends of the first and the second coupling closure form a uniform engaging element, particularly a uniform groove or spring, in each case suitable for receiving a complementary uniform, particularly only one, engaging element, which can be brought, or which is, in effective connection with a drive.

In a further preferential arrangement it is intended that the uniform engaging element of the first partial shaft and/or first partial shaft end, which is in mutual close contact, and/or the uniform engaging element of the second partial shafts and/or partial shaft ends, which are in mutual contact, are present in, or can be inserted in, a complementary uniform engaging element, which can be brought, or which is, in effective connection with a drive.

The docking devices according to the invention make it possible for the first time to provide docking devices for the transfer of bulk material, preferably in an environmentally acceptable manner, which are formed of two coupling closures, each of which has a pivotable closing flap, where the distinction between a so-called active flap and a so-called passive flap is eliminated. With state-of-the-art docking devices, such a coupling closure is called an active flap, which is, or which can be, connected to the drive. The passive flap in such conventional docking devices, however, is not directly and effectively connected to the drive. Rather is the passive flap always moved together with the active flap, which is in close contact with it. The disadvantages accompanying such torque transmission, like gap formation, leakage and uneven exertion of force and resulting wear, do not occur with the docking devices according to the invention. Docking devices according to the invention which are particularly preferred are those in which the engaging elements of complementary partial shafts or partial shaft ends, which are in close contact with each other, form a uniform engaging element, e.g., a uniform groove or a uniform spring. These uniform engaging elements can be inserted particularly reliably into a complementary uniform engaging element, which is in effective connection with the drive, e.g., via a shaft. The groove/spring systems and/or spring/groove systems, depending on whether the uniform engaging elements formed by the two engaging elements in the partial shafts form a uniform groove or a uniform spring, thus obtained are precisely fitting to each other.

It can also be intended, among other things, that the nozzle stubs, particularly the nozzle stub seals, of the first and the second coupling closure are arranged flush against each other.

Preferably, the closing flaps of the docking devices according to the invention are essentially identically dimensioned as well as particularly essentially circular.

Furthermore, an appropriate further development provides that the partial shafts and/or partial shaft ends of the first and the second coupling closure, while forming a shaft or a shaft end in the bearings formed by the bearing shells of the first and the second coupling closure, are pivotable around a common axis.

For the purpose of easier handling the docking devices according to the invention, they can furthermore have at least one guide element for at least one partial shaft or one partial shaft end of at least one closing flap.

Particularly advantageous are such docking devices, in which the engaging elements of the partial shafts or partial shaft ends, which form a shaft or a shaft end, form a uniform engaging element for a corresponding engaging element of a drive shaft, particularly in the form of a groove or a thorn.

Suitably, the docking devices according to the invention can additionally have at least one drive shaft or a shaft, which can be brought in effective connection with a drive, which has at least one engaging element complementary to at least one engaging element of the first or the second coupling closure, particularly to the uniform engaging element of the first and the second coupling closure, so that the closing flaps are pivotable about the drive, when these complementary engaging elements engage with each other.

This can also comprise a drive shaft, which is in effective connection with the drive. This drive shaft is preferably mounted on a shaft bearing arranged particularly in front of the drive.

Particularly if identically constructed coupling closures according to the invention are to be used for the docking device according to the invention, it is advantageous that the seals of the closing flaps of the first and the second coupling closure do not protrude from the external sides but in parts, wherein these sections of the seals of the first and the second coupling closure form an essentially continuous seal, when the external sides of the closing flaps are in close contact with each other.

Safe working with the docking device according to the invention succeeds particularly owing to the fact that the nozzle stubs of the first and the second coupling closure, particularly on the opposing portions of the side walls or adjacent thereto, have points for force to act on, for example, projections or extensions, by which in the coupled state the external sides of the first and the second coupling closure can be pressed against each other and/or the nozzle stubs of the first and the second coupling closure can be locked against each other reversibly.

Preferably, a locking unit is used hereby, by means of which force can be exerted on points of the first and the second coupling closure for force to act on from essentially opposing directions, particularly from the direction of the container. Such a locking unit according to the invention, which is suitable for locking two nozzle stubs of coupling closures according to the invention, comprises a body with a locking side, which can be rotated about an axis, wherein the locking side of the body has at least one first projecting element and at least one second projecting element, wherein the first and the second element are at least in parts in one plane, which is essentially angular to the axis of rotation, in particular perpendicular to the axis of rotation, wherein the distance of the first element and the second element to the axis of rotation is in each case smaller than the distance of the first and the second element to each other, and wherein the first and the second elements can be rotated from a locking position to an open position and vice versa by rotation of the body about the axis of rotation.

The body which can be rotated about an axis can have for example the form of a brace or a pivotable disk. The axis of rotation of this body is preferably perpendicular on the surface extending on the locking side of the body and is directed away from this locking side. This axis of rotation cuts the connecting side in one point, wherein this intersection of the axis of rotation with the connecting side is located between the first and the second element and particularly on the connecting line between the first and the second element. Each of the first and the second elements of the locking unit which are opposing each other have preferably areas for pressure to be applied to, preferably concave at least in parts. The forces to be exerted for locking two coupling closures are particularly small with such locking units, in which the first and/or the second element have/has the form of a roller and/or a cylinder, preferably the form of a roller which can be rotated about an axis and/or a cylinder which can be rotated about an axis. The axis of rotation of these rollers or of a cylinder is preferably arranged essentially parallel to the axis of rotation of the body.

Furthermore a particularly practicable embodiment of a docking device according to the invention further comprises a working platform or docking platform, on which at least one, particularly two drives as well as, if required, at least one, particularly two locking units and/or at least one, particularly two shaft bearings for a drive shaft are mounted.

Docking devices according to the invention can furthermore be characterized in that the nozzle stub of the first and/or the second coupling closure comprises within the range of the partial shafts or partial shaft ends at least one limit stop and/or at least one guide element for the shaft bearing of the drive shaft or the drive.

A further development of the docking device according to the invention is characterized in that the engaging elements and/or the partial shafts or partial shaft ends of the first and the second coupling closure comprise in each case at least one partial locking element suitable for forming a first locking element and that the complementary engaging element or the drive shaft comprises a second locking element, which corresponds to the first locking element, and that by relative motion of the first and the second locking element towards each other a locking unit can be formed, whereby the first and the second coupling closures can be pressed and/or locked against each other. This embodiment uses the circumstance that for the actuation of the closing flaps of the docked coupling closures, which are in close contact with each other, the engaging elements of the partial shafts and/or partial shaft ends and/or the entire shaft and/or entire shaft end formed by these need to be engaged with the complementary engaging element of the drive shaft. By providing partial locking elements at the respective coupling closures, which together form a first locking element, which can interact with a second locking element of the drive shaft and/or the complementary engaging element by forming a locking unit, the described action of engaging the engaging elements can alone bring about the effect that the coupling closures or the external sides of the closing flaps, which are in close contact with each other, can be locked or pressed against each other. In this way it is inevitably ensured that the respective coupling closures are always firmly locked together during operation of the docking device according to the invention.

In a preferred embodiment the partial locking elements of the first and the second coupling closure comprise in each case a contact area, which faces at least in sections the container side and which is radial, particularly in relation to the common axis of rotation of the closing flaps, and/or, at the front ends of the partial shafts or partial shaft ends, one groove or spring, which in each case is in particular at least in sections radially circumferential. Particularly preferably in this embodiment, the partial locking elements form contact areas, which in the cross section are convex, particularly semicircular. In the docked condition these contact areas of the partial locking elements of the first and the second coupling closure preferably have a cylindrical shape in the form of the first locking element. The corresponding second locking element is then preferably a cylinder-shaped sleeve present at or on the drive shaft, into which the first locking element can be inserted, particular properly matching. Hereby the inside diameter of the second locking element and the outside diameter of the first locking element must be adjusted to each other in a manner known in the art, in order to achieve always trouble-free reversible locking and release without having to accept shortcomings in the locking function. A further advantage of using a second locking element, which essentially receives the first locking element, is the fact that not only decoupling of the docked coupling closures of the transfer operation is prevented, but in addition any lateral shifting of the coupling closures against each other is excluded. In this way, operational safety is increased even further.

Alternatively, as described above, a spring or a groove, for example a continuous circumferential one, can be present in the front end of the partial shaft and/or partial shaft end, which can likewise engaged with a corresponding spring or groove in the area of the front end of the drive shaft when engaging the corresponding engaging elements. Also with this construction not only an uncoupling movement but also lateral shifting of the coupling closures can be prevented.

A further advantageous embodiment provides that the partial locking elements of the first and the second coupling closure are a component of the engaging elements of the first or the second coupling closure and, in particular, that they form a first locking element, particularly in the form of a wedge, a cone or a truncated cone. In this variant the partial locking elements allow to exert force when engaging the corresponding engaging elements, in each case towards the closing side of the associated coupling closure. In this way, the coupling closures are pressed against each other when the engaging elements are engaged.

Particularly in regard of the embodiment described above, it is advantageous, if the front end of the complementary engaging element comprises first and second contact areas, which are facing each other at an angle, wherein during an axial relative motion of the complementary engaging element for engaging the engaging elements or the entire engaging element of the first and the second coupling closure with the complementary engaging element the first contact area of the complementary engaging element can be brought in contact with the engaging element of the first coupling closure and the second contact area of the complementary engaging element can be brought in contact with the engaging element of the second coupling closure, whereby the first and the second coupling closures can be pressed and/or locked against each other.

According to the invention it can furthermore be intended that the partial shafts or partial shaft ends of the first and the second coupling closure have in each case a stop face at least in parts, which is radial, particularly in respect of the axis of rotation, as partial locking elements which, while forming a first locking element, are arranged in opposite directions at least in parts, facing the respective container side of the coupling closure, and that the complementary engaging element and/or the drive shaft have, as a corresponding second locking element, contact area sections at the front end, which are in particular radial in respect of the axis of rotation, essentially opposing each other and facing each other at least in parts, and by means of which the stop faces of the first and the second coupling closure can be pressed and/or locked against each other in particular due to interaction with these stop faces when engaging the engaging elements and/or the entire engaging element of the first and the second coupling closure.

Hereby it can be intended that the corresponding second locking element comprises a cylindrical section, particularly a section which surrounds the complementary engaging element at least in parts.

The further development of a docking device according to the invention described above renders redundant the employment of separate locking units for holding the docked coupling closures against each other during the bulk material transfer. This represents a simplification, both of the construction and the method, however without having to accept reduced operational safety. Instead, the danger of operational disturbances is again reduced, since whenever the corresponding engaging elements of the entire shaft and/or entire shaft end and the drive shaft are engaged with each other, the docked coupling closures will inevitably be locked and/or pressed together.

Of course it is likewise possible to provide the described locking units on both sides of the axis of rotation, i.e., at both shafts or shaft ends, particularly even if the coupled closing flaps of the docked coupling closures are rotated not only by one drive, but by two drives, which are present in each case at the opposing sides of the axis of rotation.

The object of the present invention is furthermore realized by a working and/or a docking platform, also called opening tool, for a docking device for the transfer of bulk material, in particular in an environmentally isolated manner, comprising at least one, particularly two drives mounted on a platform, a passage in the platform for a coupling closure of a docking device and, if required, at least one, in particular two locking units for locking and/or pressing against each other the external sides of closing flaps of docked coupling closures of a docking device and/or at least one shaft bearing for a drive shaft, which is in effective connection with the drive. Particularly preferably this working platform furthermore comprises at least a coupling closure according to the invention. According to the preceding remarks, the docking platform has thus at least one drive on one side as well as, if required, at least one locking unit and/or at least one shaft bearing. These constructional units are generally firmly connected to the platform of the docking platform, so that the docking platform can be used in any position. For example, these constructional units can rest upon this platform, or this platform can be turned by 180°, so that these constructional units are fastened in hanging position. Of course it is possible, beside the described essentially horizontal arrangement, to arrange the platform also vertically for the transfer operation between two coupled coupling closures. In a further embodiment at least one of the coupling closures can be already firmly connected to the platform. In an embodiment variant, the platform is suitable e.g. for fixed connection to a container. This embodiment is preferably selected, if a container is to be filled from smaller containers and/or containers of small nominal width. The coupling closures of these containers can be connected usually without any problem with the coupling closure already available in the working platform without damaging the respective single components. However, with larger and/or heavier containers or containers with openings of a larger nominal size, it has proved to be advantageous to arrange the docking platform and/or the coupling closure present in the passage of the working platform flexibly or swimming. For example, the coupling closure can be connected with a container by flexible bellows. Furthermore it is alternatively or additionally possible to provide the platform with flexible stands or feet in order to ensure a certain flexibility, so that during the docking of two coupling closures evasive movements of the same are possible. In a further embodiment the docking platform according to the invention can comprise a lifting device. In this way it is possible, for example, to bring a coupling closure, for example pneumatically or hydraulically, close to a corresponding coupling closure while forming a docking device according to the invention.

Finally the object of the invention is realized by a method for decanting, filling and/or emptying containers, particularly in an environmentally isolated manner, comprising the steps of:

- Providing a first coupling closure according to the invention, which is connected to a first container, wherein the closing flap is in the closed position,
- Providing a second coupling closure according to the invention, which is connected to a second container, wherein the closing flap is in the closed position,
- Coupling the first coupling closure with the second coupling closure at their respective closing sides, thus forming a docking device according to the invention,
- Establishing an effective connection of the drive shaft of a drive with the shaft of the docking device by engaging the engaging element of the shaft of the docking device with the complementary engaging unit of the drive shaft,
- Moving the closely fitting closing flaps from the closed position to a position which releases the transfer channel at least partly by actuating the drive,
- Transferring bulk material from the first container to the second container, or vice versa,
- Moving the closely fitting closing flaps to the closed position by actuating the drive,
- Decoupling the first and the second coupling closure while detaching the docking device.

It can be intended that before moving the closely fitting closing flaps from the closed position the coupled coupling closures of the docking device are locked and/or pressed against each other by at least one, particular at least two, contrivance(s) for the exertion of force and that the contrivance for the exertion of force releases the first and the second coupling closures again after moving the closely fitting closing flaps back to the closed position.

The present invention was based on the surprising finding that docking devices of very low contamination, which are at the same time user-friendly, can be obtained by using two passive flaps coupled to each other by suitable locking elements, which can be pivoted about a common axis by a separate external drive. Thus it becomes possible for the first time to obtain a functional docking system with two essentially identically constructed coupling closures. Thus it is possible to manage completely without the use of particularly coordinated active and passive flaps. Moreover, the docking devices according to the invention do not show any gap formation even when using closing flaps of very large nominal width. A further major advantage of the coupling closures according to the invention or the docking systems according to the invention is the large handling range. For the first time bulk material can be transferred for example from a stationary container to a mobile container and vice versa without any problem and without major expenditure. The user is no longer forced to pay attention to using an active flap exclusively with the stationary container and to keep a corresponding passive flap ready. Among other things, also the use of hoses or pipes for the transfer of bulk material between two containers can thus be reduced though not avoided, which in turn substantially reduces the necessary cleaning effort. Besides, the transfer between two containers by means of hoses or pipes has regularly required two separate docking systems. Use of the coupling closures and docking devices according to the invention renders this unnecessary.

Figure 4:
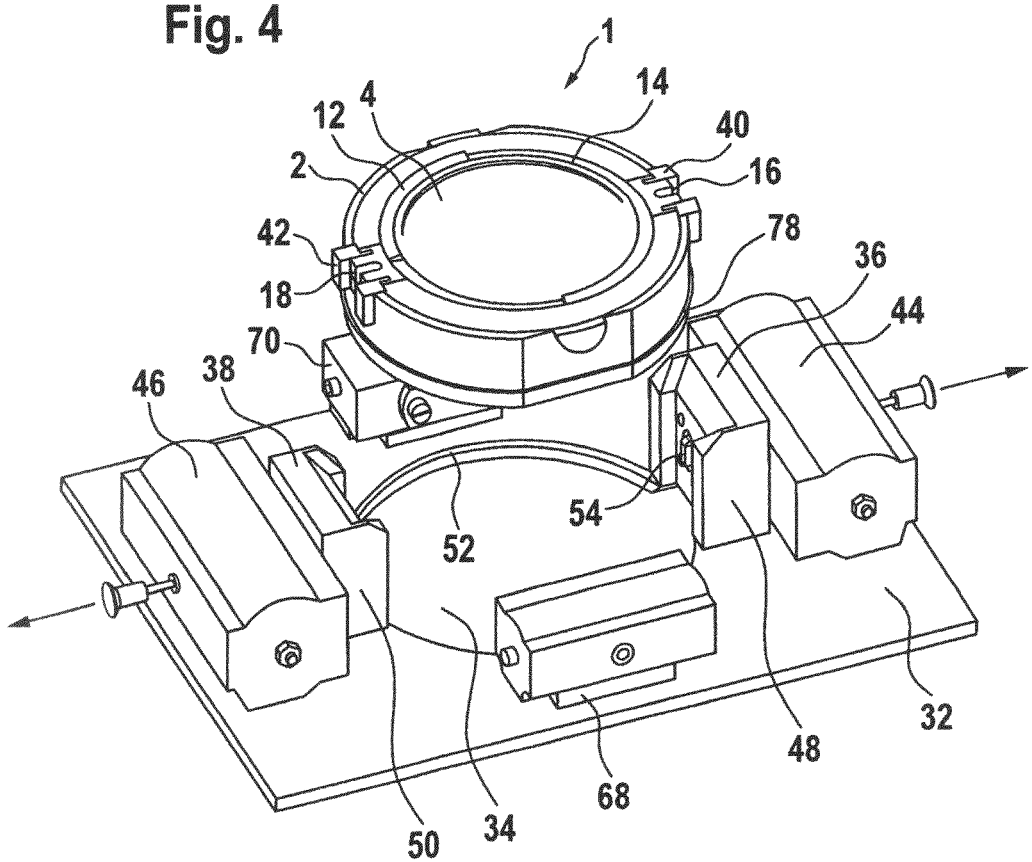
Figure 5:
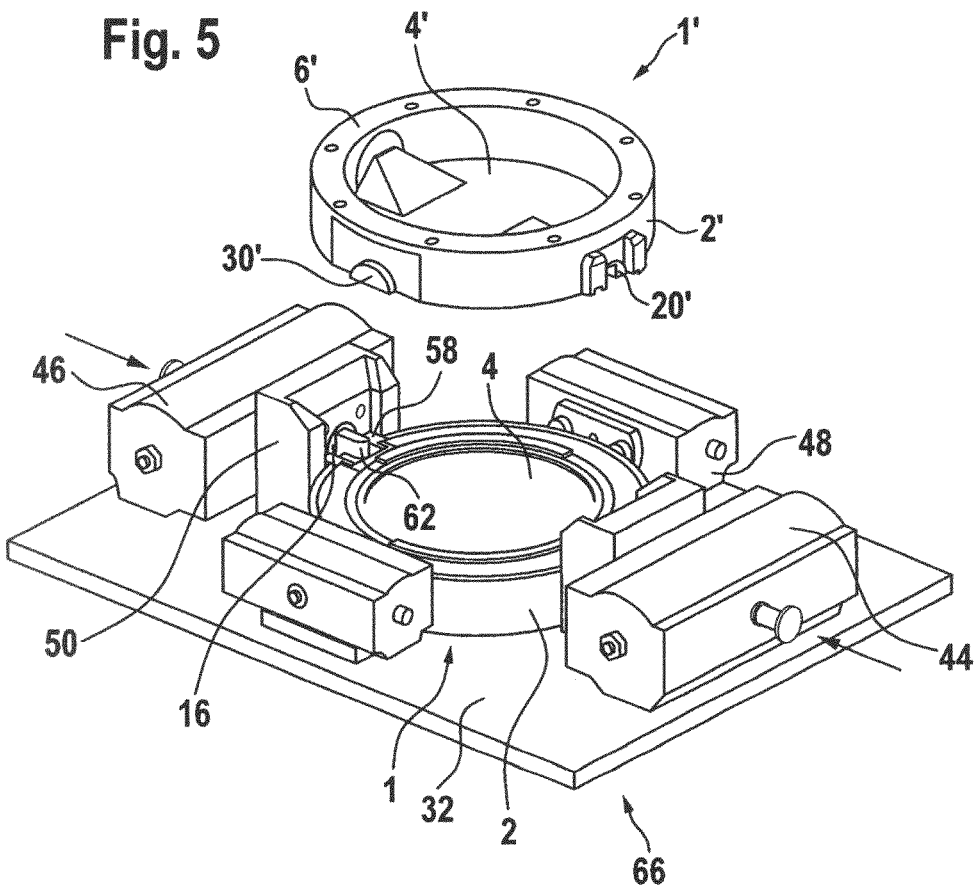
Figure 6:
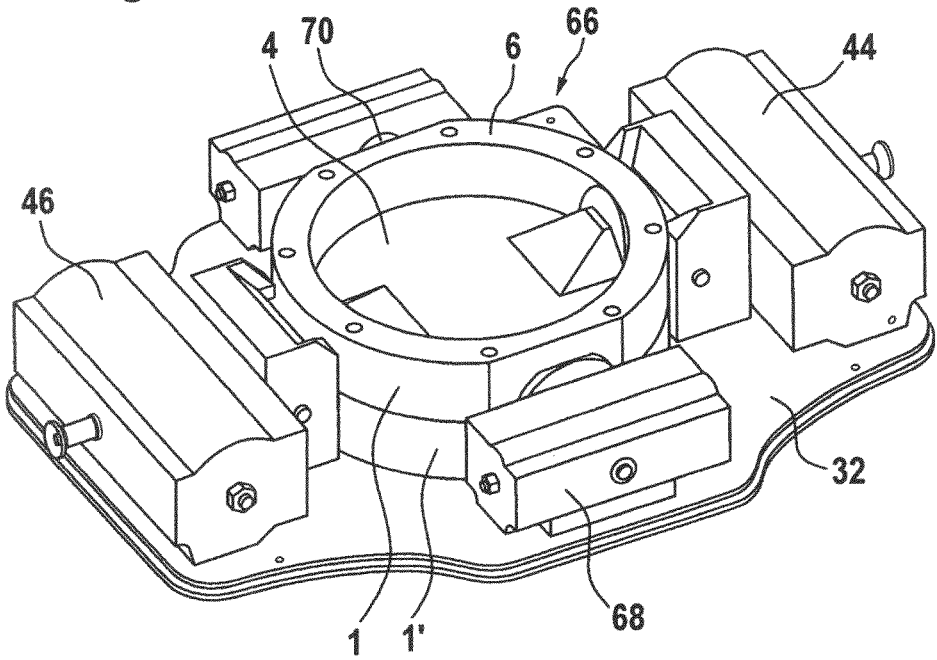
Figure 7:
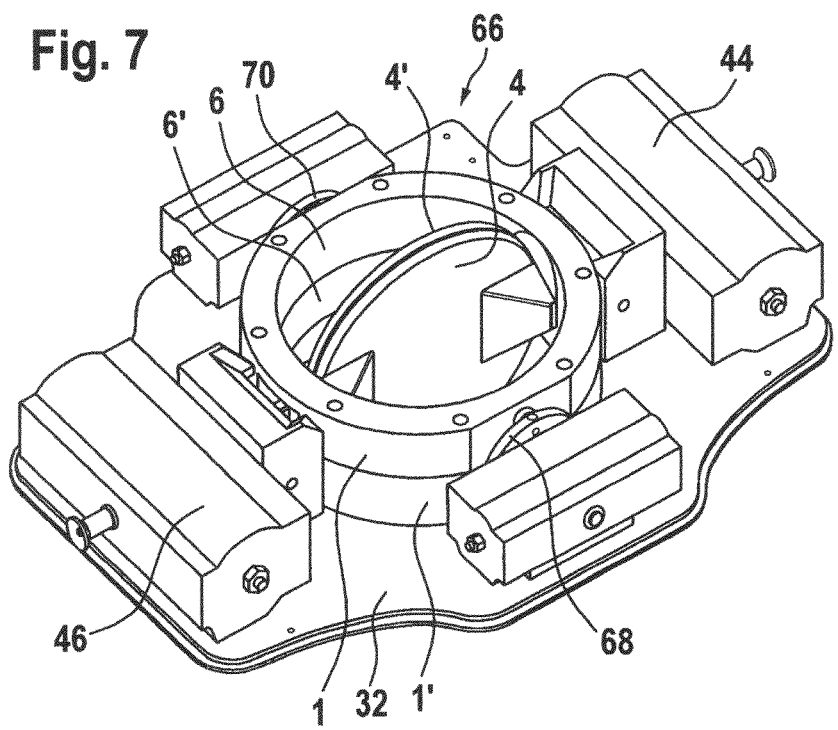
Figure 8:
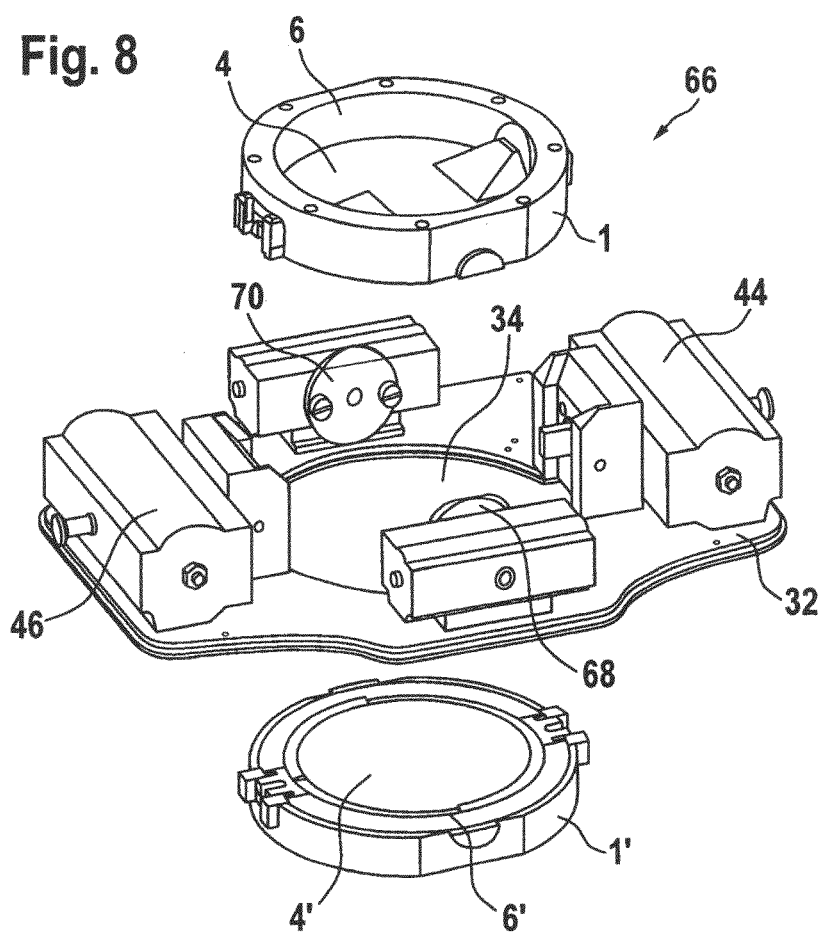
Figure 9:
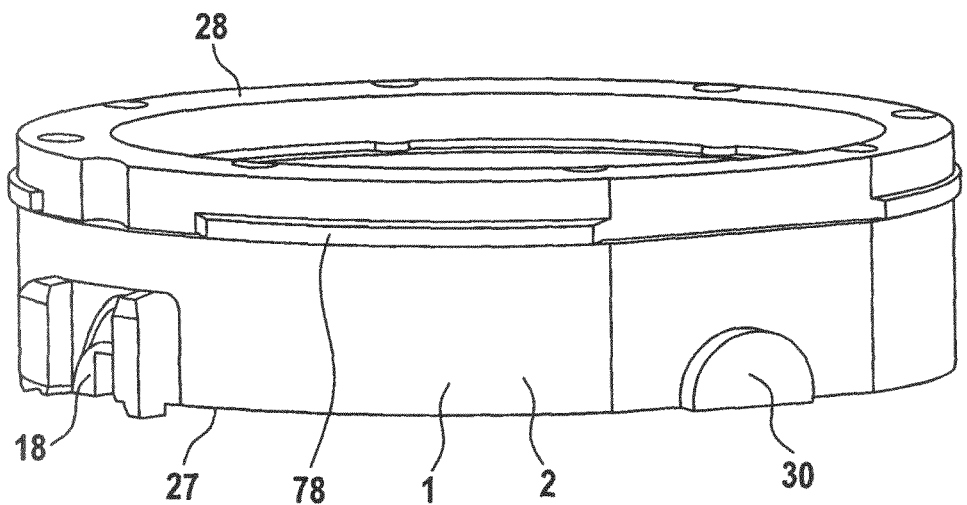
Figure 10:
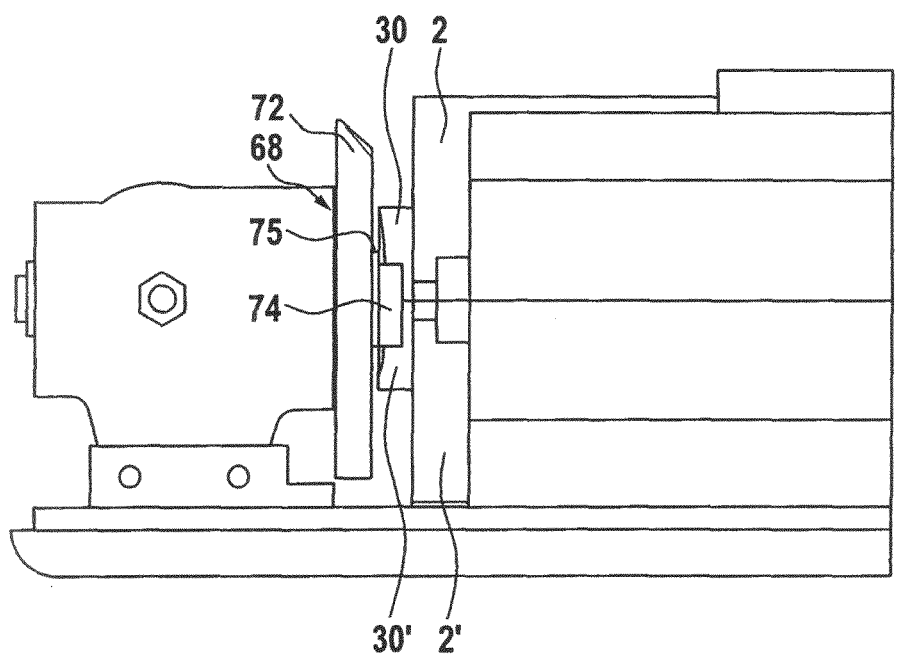
Figure 11:
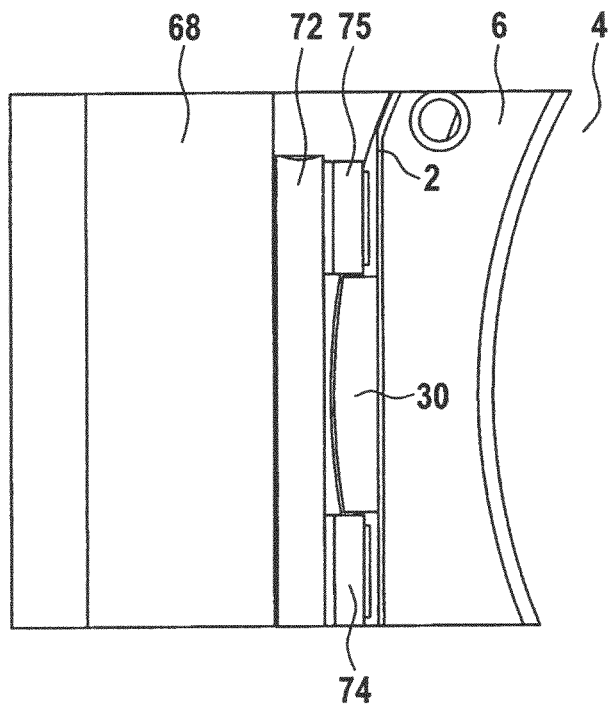
Figure 12:
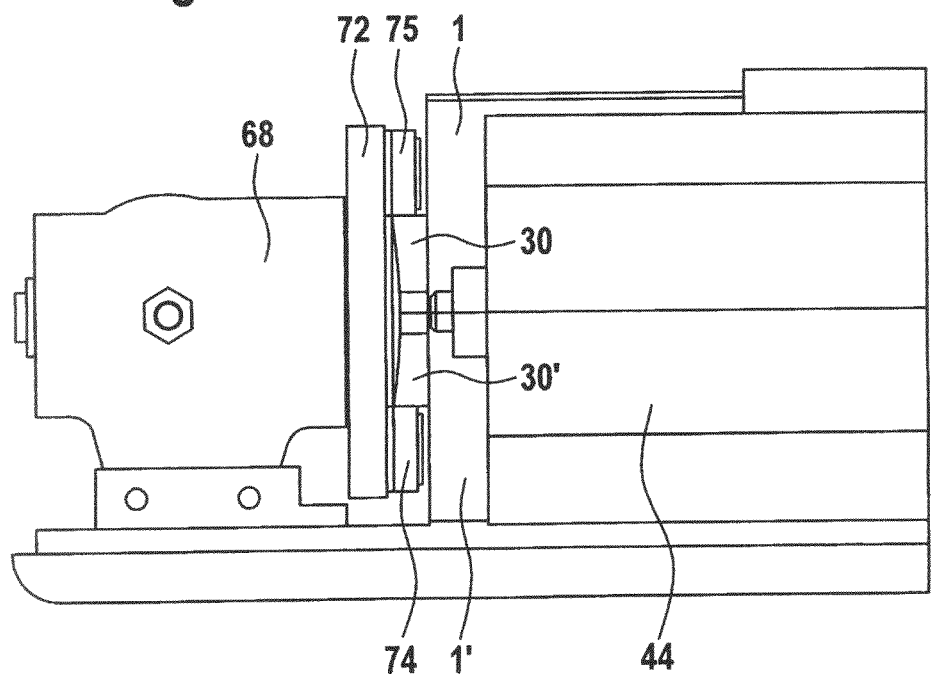
Figure 13:
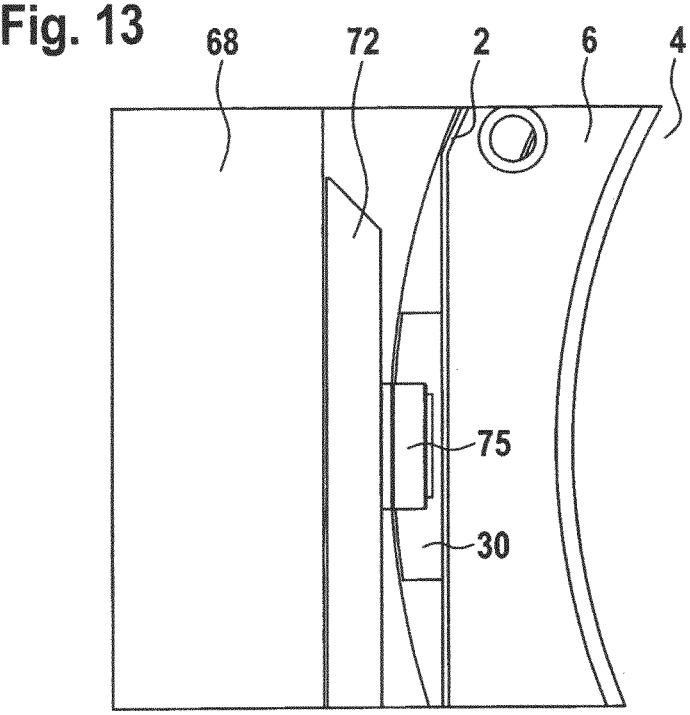
Figure 14:
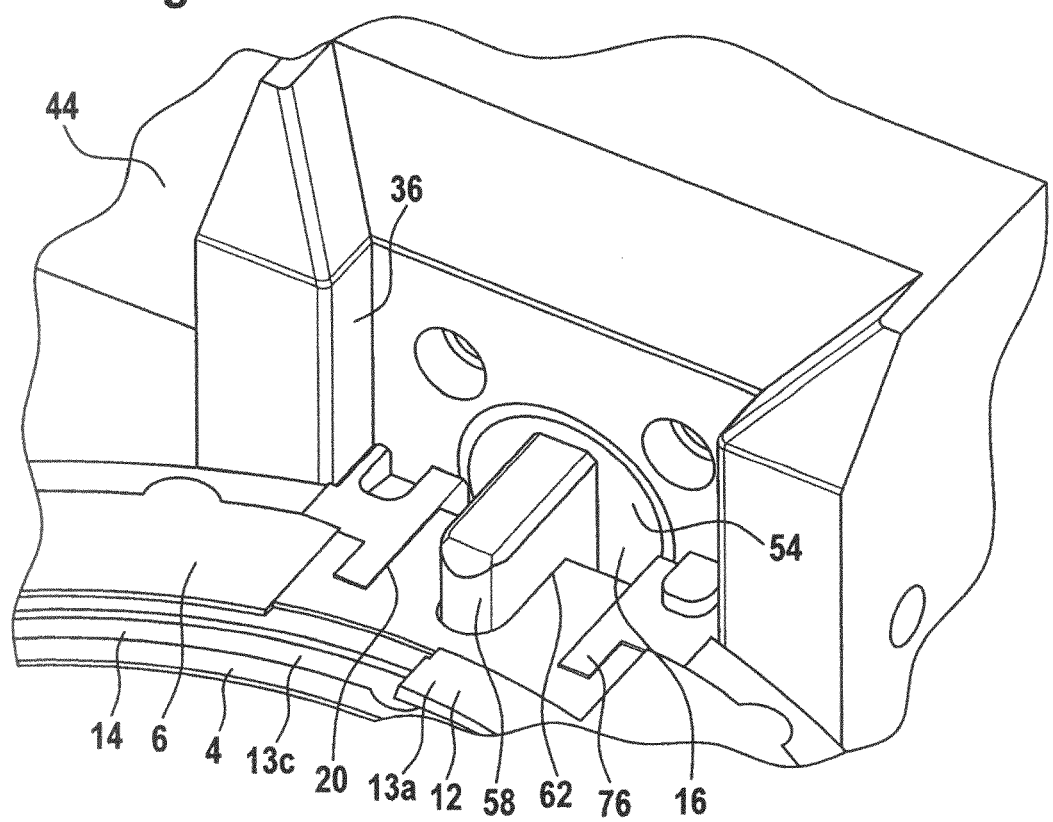
Figure 15:
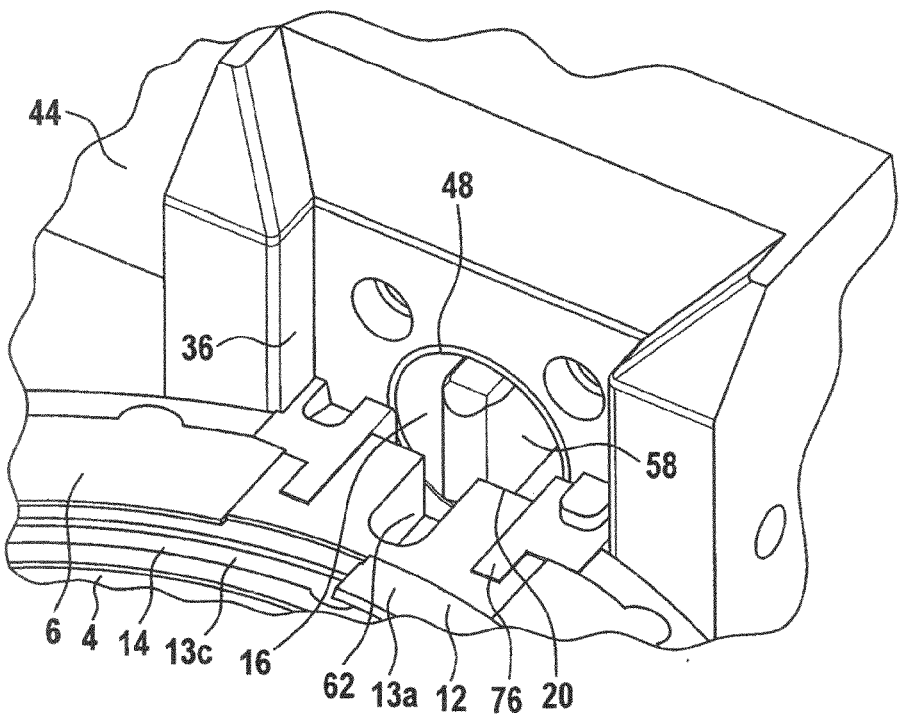
Figure 16:
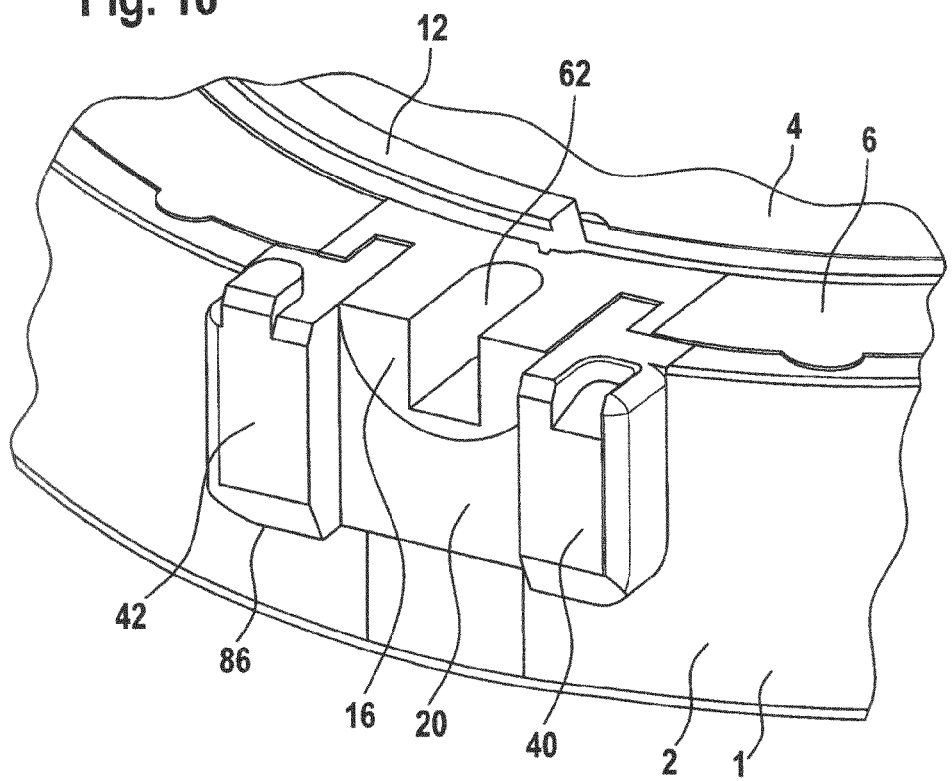
Figure 17:
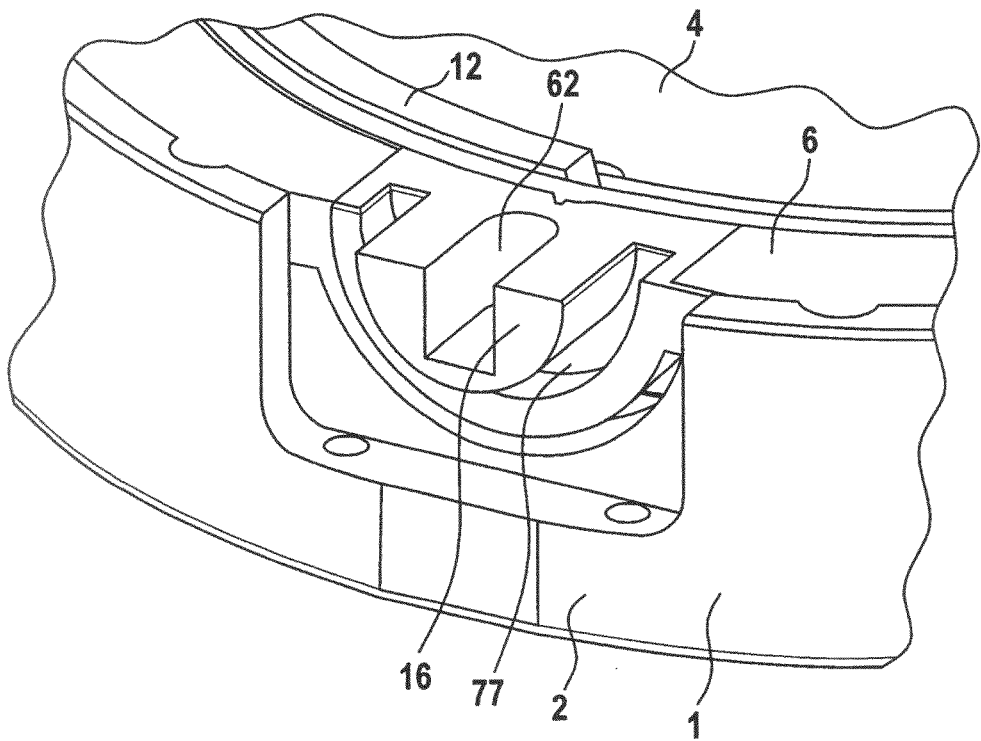
Figure 18:
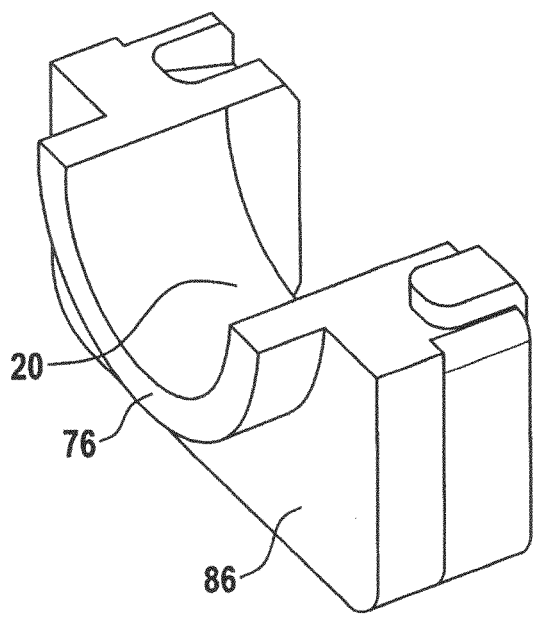
Figure 19:
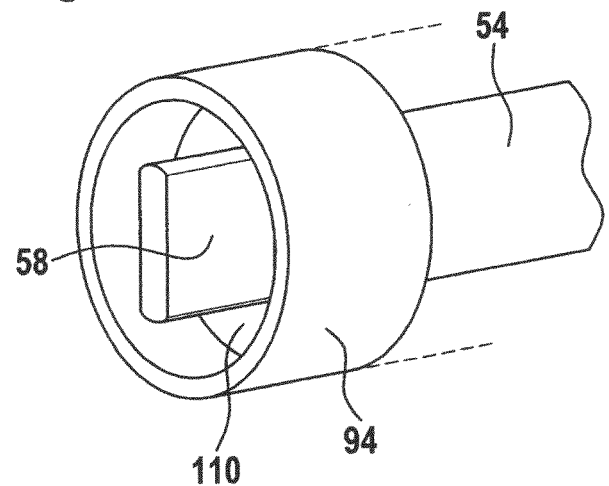
Figure 20:
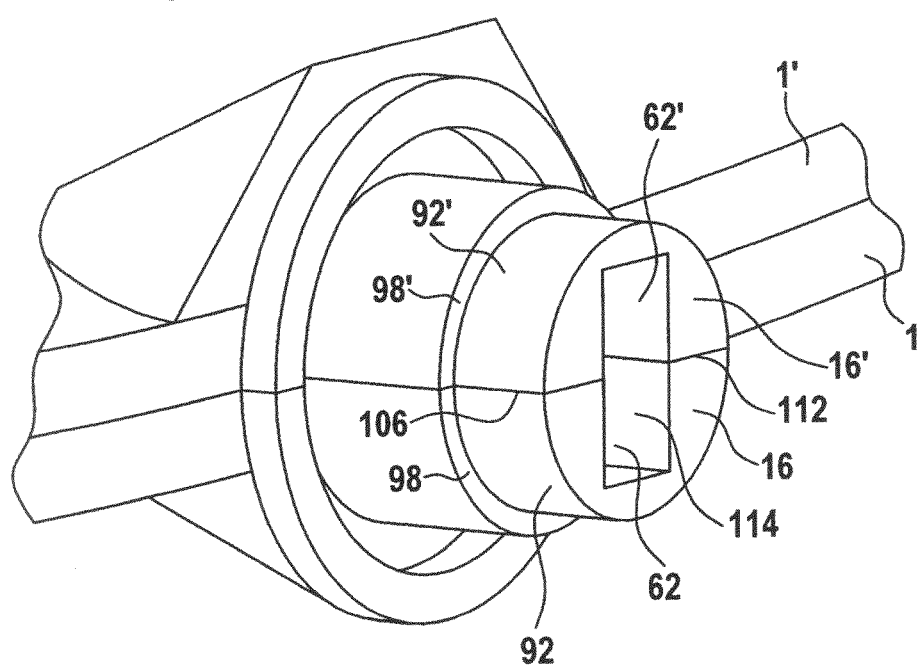
Figure 21A:
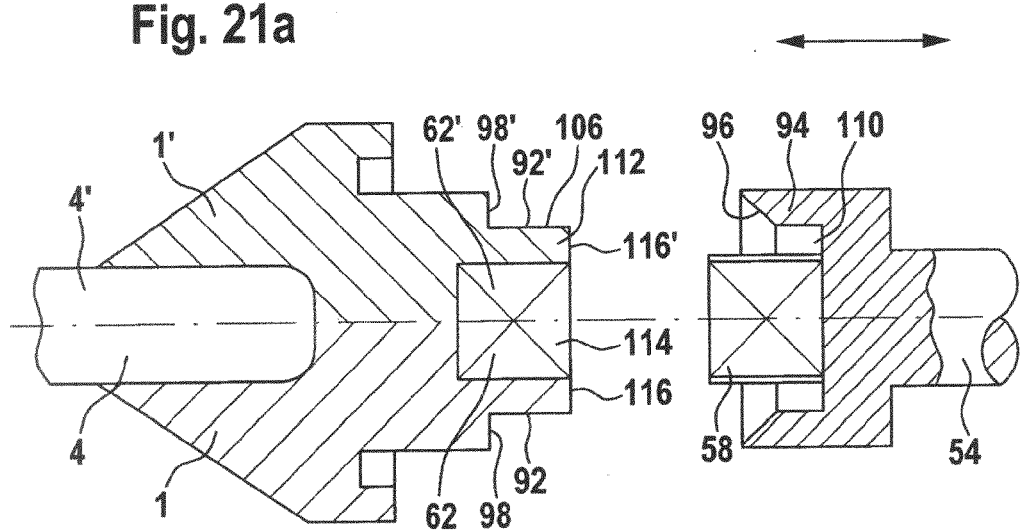
Figure 22A:
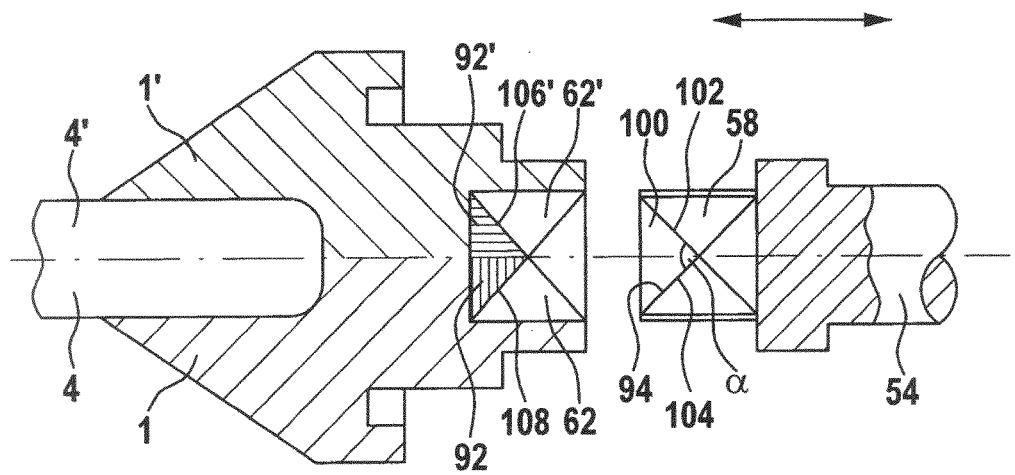

Further advantages, characteristics and possibilities of application of the present invention result from the following description of a preferred exemplary embodiment in connection with the attached figures. In these figures:

FIG. 1 shows a perspective view of a coupling closure according to the invention, as seen from the closure side, FIG. 2 shows a perspective top view of the container side of the coupling closure according to FIG. 1, FIG. 3 shows a perspective top view of a docking platform according to the invention, FIG. 4 shows a perspective top view of a coupling closure according to FIG. 1 and a docking platform according to FIG. 3, FIG. 5 shows a perspective top view of a docking device according to the invention, FIG. 6 shows a perspective top view of a docking device according to FIG. 5 in the completely docked closed state, FIG. 7 shows a perspective top view of a docking device according to FIG. 6 in the open state, FIG. 8 shows a perspective top view of a docking device according to the invention with working platform in a state not yet docked, FIG. 9 shows a perspective side view of a coupling closure according to the invention, FIG. 10 shows a perspective top view of a locking unit according to the invention and a part of a docking device according to the invention, FIG. 11 shows a schematic top view of the locking unit according to FIG. 10, FIG. 12 shows the locking unit according to FIG. 10 in the closed state, FIG. 13 shows a schematic top view of the locking unit according to FIG. 12, FIG. 14 shows a schematic top view of a partial section of the docking device according to the invention, FIG. 15 shows a perspective top view of a partial section of the docking device according to the invention, FIG. 16 shows a perspective side view of a partial section of a coupling closure according to the invention, FIG. 17 shows the view according to FIG. 16 without bearing shell, FIG. 18 shows the perspective top view of a bearing shell according to the invention, FIG. 19 shows the schematic perspective view of the front end of a drive shaft of an alternative realization of the docking device according to the invention, FIG. 20 shows the schematic perspective view of the front ends of the partial shaft end of coupled coupling closures of the alternative realization of the docking device according to the invention, FIGS. 21*a*), *b*) show the schematic cross-sectional view of the engagement of the engaging elements according to FIGS. 19 and 20, and FIGS. 22*a*), *b*) show the schematic cross-sectional view of the engagement of the engaging elements of an alternative realization of a locking device of a docking device according to the invention.

FIG. 1 shows a perspective top view of a coupling closure 1 according to the invention as seen from the coupling or closure side. The coupling closure is provided with a nozzle stub 2 having a substantially circular basic shape, in which a closing flap 4 is mounted. The shown coupling side of the nozzle stub and the inside part thereof (not shown) are provided with a circumferential nozzle stub seal 6. In the shown embodiment, this seal 6 on the coupling side of the nozzle stub 2 is designed such that it is arranged substantially in one plane with the external side 8 of the closing flap, i.e., flush therewith. The closing flap 4 is provided with a sealing ring 12 or sealing sections, which is/are embedded in the external side 8 in the area of the circumferential rim 10. The shown sealing ring has a total of four circle segments (a) to (d) of essentially the same length, wherein the segments being opposite each other are substantially identical in each case. The segments (a) and (b) protrude from the external surface 8 of the closing flap 4, while the segments (c) and (d) are slightly embedded in the circumferential groove 12 of the external side 8 of the closing flap. Optionally, these embedded segments can be omitted completely. If the seal 12 is designed as described above, a sealed docking device according to the invention can already be obtained using just one more coupling closure having the same structure. In this case, the protruding sealing parts (a) and (b) engage with corresponding lowered sealing parts of the corresponding coupling closure, and protruding sealing parts of this corresponding coupling closure engage with the corresponding lowered parts c) and d) of the coupling closure 1, thus forming a continuous entire seal. The closing flap 4 is followed by partial shaft ends 16 and 18, which are arranged opposite each other along an axis. These partial shaft ends are semiaxles whose side facing the closure side is flattened. The partial shaft ends 16 and 18 having the form of semiaxles are each provided with an engaging element 62 and 64, respectively, in the form of a groove into which a corresponding projection or thorn of a drive shaft can be inserted. Furthermore, the bearing shell 20 or 22 for the partial shaft ends is provided in the form of a separate insert 86 in the nozzle stub 2. The material of the bearing shell is preferably made from an abrasion-resistant plastic, preferably PEK or PEEK. Moreover, projections 30 and 31 are provided on the side wall of the nozzle stub 2, which are arranged in positions opposite each other and which are intended for improved locking of a docking device formed by two coupling closures according to the invention; these projections will be discussed in detail below. In the closed state, the flattened part of the partial shaft ends 16 and 18 is arranged substantially in one plane, i.e., flush, with the external side 8 of the closing flap. The partial shaft ends 16 and 18 are mounted in bearing shells 20 and 22, which are embedded in the nozzle stub 2, so as to be pivotable. The closure side 27 of the coupling closure 1 is arranged opposite the equipment or container side 28 thereof. Accordingly, the nozzle stub 2 is connected to a corresponding container or conveyance, for example, a hose or a pipe, in an environmentally sealed manner on its equipment or container side during the decanting process. The equipment or container side of the coupling closure 1 is illustrated in detail in FIG. 2. The nozzle stub seal 6 covers the inner side and the rim of the nozzle stub 2 facing the equipment side to their full circumference and extends up to the external side wall of the nozzle stub. The circumferential rim 10 of the circular closing flap 4 is arranged flush in the seal 6 in the closed position. The shaft ends 16, 18 (not shown) are supported by wedge-shaped attachments 24 and 26, which are provided on the equipment side 28 of the closure flap 4 and are formed integrally therewith. Furthermore, FIG. 2 shows one of the two bearing shells 20 which are embedded in the rim of the nozzle stub facing the closure side. The shaft ends 16, 18, which are provided in the form of a semiaxle, are supported on these bearings so as to be pivotable. In addition, the external wall of the nozzle stub 2 is provided with projections 30 and 31 (not shown) in the form of a semicircle for the application of force, which are preferably offset by 90° relative to the pivot axis formed by the shaft ends 16, 18 arranged opposite each other. Moreover, limit stops 40 and 42 are provided on the external wall of the nozzle stub 2 in the area of the bearing shells. These limit stops can be formed integrally with the insert 86 for the bearing shell and have two functions. On the one hand, their front end serves as a limit stop for an adjusting aid or a housing, e.g., that of the drive shaft, and on the other hand, the coupling closure 1 can be brought exactly into position in front of the respective drive shafts by interaction with a corresponding guide device 36, 38.

FIG. 3 shows a docking platform 32 which is designed to bring the docking device according to the invention from a closed position into an open position in order to transfer bulk material. This platform 32 is provided with a passage 34 whose dimensions substantially correspond to the outside diameter of the nozzle stub 2 of the coupling closures according to the invention. In order to facilitate manipulation and, in particular, to make docking of the devices according to the invention easier, the working platform 32 is provided with guide devices 36 and 38 arranged at positions opposite each other. Corresponding limit stops 40 and 42 (not shown), which are provided on the external sides of the nozzle stubs 2, can be inserted into these guide device 36 and 38 so that the shaft ends 16, 18 can be positioned correctly without problems. The working plate 32 is further provided with drives 44 and 46 as well as shaft bearings 48 and 50, which are arranged at positions opposite each other. In addition, locking units 68 and 70 are mounted on the working platform 32 in positions opposite each other. The purpose of these units is to lock the coupling closures fitting tightly to each other and forming a docking device according to the invention against each other while bulk material is being transferred. The exact function of these units will be described in more detail below.

As shown in FIG. 4, a first coupling closure 1 can be inserted into the passage 34 of the working platform 32 by means of the guide devices 36 and 38. The passage 34 can be dimensioned and designed such that it has a support rim 52 on which the first coupling closure 1 can be supported on the container side. The shaft ends 16 and 18 will then be located automatically at the correct height in front of the drive shafts 54 and 56 (not shown). In addition, the docking platform 32 is provided with two locking units 68 and 70, which are mounted opposite each other, whose function will be discussed in detail below.

In order to be able to insert one and the same coupling closure into the passage 34 from above, as illustrated in FIG. 4, as well as from below, as indicated in FIG. 8, the nozzle stub 2 is on the container side provided with a circumferential support extension 78 which extends beyond the outside dimensions of the nozzle stub 2 and is intended for insertion from above according to FIG. 4. This support extension 78 is therefore dimensioned such that it comes to rest on the support rim 52 of the passage 34. Furthermore, the thickness of this support extension 78 is dimensioned such that the shaft ends 16 and 18 will be located at the height of the drive shafts 54 and 56. If, as in the present case, the engaging elements 62 and 64 are provided in the form of a groove which is not completely continuous, the drive shafts with the complementary engaging elements of the drive shafts, as shown in FIG. 4, have to be retracted. FIG. 3, however, shows the complementary engaging elements 58 and 60 in their extended state, in which they engage with the engaging elements of the shaft ends.

FIG. 5 shows the first coupling closure 1 which is inserted in the docking platform 32, wherein the complementary engaging elements 58 and 60 (not shown) of the drive shaft, which are provided in the form of a thorn, have already been inserted axially into the engaging element 62 of the partial shaft end 16, which is provided in the form of a groove which is open upwardly. In this state, the complementary engaging elements 58 and 60 can also be used as centring devices for the second coupling closure 1' to be coupled.

FIG. 6 shows the coupled docking device 66 which is provided on the docking platform 32. Both coupling closures 1 and 1' fit tightly to each other and are aligned with each other by means of their closure sides. The engaging elements of the partial shaft ends fitting tightly to each other form a uniform engaging element 80 (not shown) in the form of groove which is limited upwardly and downwardly and which engages with the complementary engaging element 58 of the drive shaft, which is provided in the form of a flattened thorn. This applies to both entire shaft ends 82 and 84 (not shown) which are opposite each other. Accordingly, the closing flaps 4 and 4' (not shown) fitting tightly to each other can be pivoted about their common axis by synchronous operation of the two drives 44 and 46 in order to bring them into an open position, as shown in FIG. 7. The complementary engaging elements 58 and 60 can also be operated manually in order to bring them into the engagement position as well as from this engagement position back into a released position, as indicated by the arrows in FIGS. 3 to 6. The locking units 68 and 70 are arranged on the docking platform on an axis which is perpendicular to the axis of rotation. These devices are intended to lock or press the coupling closures 1 and 1' against each other in the coupled state. This process is shown by way of example in FIGS. 10 to 13.

As shown in FIG. 10, the external sides of the nozzle stubs 2 and 2' are provided with projections 30 and 30', respectively. Force can be applied to these projections in the direction from the container side. A suitable device for this exertion of force is, for example, the device 72 in the form of a disk, as illustrated in FIG. 10, which is mounted to be rotatable and forms part of the locking unit 68. As can be seen in FIG. 11, the rollers 74 and 75 provided on opposite sides of the disk 72 are spaced such that a force is exerted on the projections 30 and 30' when the disk is rotated by 90° so that the nozzle stubs 2 and 2' or the seals thereof are pressed against each other (see also FIG. 12). The projections 30 and 30' are convex. Their outside circumferences are, at least in sections, substantially located on a common circle periphery in the locked state. In the non-locked state, the projections 30 and 30' form an eccentric system due to the seals 12 and 12' of the coupling closures 1 and 1' fitting tightly to each other. By adjusting the distance of the rollers 74 and 75 such that it substantially corresponds to the diameter of said circle periphery, it is possible to apply force from opposite directions by means of the projections 30 and 30', which are spaced apart by the seals, when the disk 72 is rotated about the central axis of rotation from an open position, in which the rollers 74 and 75 are arranged on a line which is substantially parallel to the external side of the closing flaps fitting tightly to each other, into a locking position, in which this line is rotated by 90°. The projections 30 and 30' as well as 31 and 31' (not shown) are suitably provided with recesses on their opposite side rims so that the coupling closures can be inserted into the locking unit 68 without problems. The locking state of the locking unit 68 can be seen best when the views shown in FIGS. 12 and 13 are placed next to each other. While FIG. 12 shows the side view, FIG. 13 shows a schematic top view. By exactly adjusting the distance of the rollers 74 and 75 to the degree to which the seal 12 extends beyond the external sides of the closing flaps, a particularly tightly sealed docking device can be obtained in the locking state. In this way it can be ensured that no bulk material contaminates the environment, or bulk material is contaminated by environmental influences during the transfer process. In this state, the docking device can then be opened by means of the drives 44 and 46, as illustrated in FIG. 7.

In order to decouple the coupling closures from each other, first the locking units 68 and 70 must be released again. Subsequently, the coupling closure being on top can be removed. If the drive shafts 54, 56 are then moved along the axis of rotation away from the shaft ends 16, 18, the second coupling closure will also be released so that it can be removed from the docking platform (see also FIGS. 14 and 15). This is possible because the corresponding engaging elements are no longer in contact with each other and therefore the coupling closure which is inserted in the passage 34 can be removed form the working platform 32. FIGS. 14 and 15 also show a guide and support element 76. This element supports the shaft end. Due to the engagement of groove and spring elements with each other, the shaft end is always guided correctly and reliably during rotation. In addition, the device 76 ensures that the shaft end 16 is held securely in the bearing shell 20. By appropriate selection of the materials it is even possible to dispense entirely with lubricants.

FIG. 16 shows again clearly the separate insert 86 for the bearing or the bearing shell 20. This insert is embedded in a corresponding recess of the nozzle stub 2, as shown in FIG. 17. The rounded side of the partial shaft end 16 therefore rests completely and exclusively on the bearing shell 20 of this insert 86. The bearing shell 20 is, in addition, designed as a guide element 76 or comprises such a guide element. This guide element 76, which in the shown embodiment (see also FIG. 18) is an extension of the bearing shell 20, engages with a corresponding indentation 77 in the form of a spring/groove interaction (see also FIG. 17). In this way, the shaft end or the closing flap 4 connected thereto can be supported in an extremely reliable and secure manner. The guide element 76 provided as part of the insert 86 therefore ensures a secure hold of the partial shaft and prevents displacement of the same in the axial direction as well as it prevents the closing flap from falling out of the nozzle stub.

By use of a working platform on which the drives are already provided in a firmly fixed manner, two coupling closures can be coupled in an error-free manner for a long time. Furthermore, it is particularly advantageous that the docking device according to the invention is obtained using coupling closures which are identical in structure. In addition, the docking device according to the invention is provided on the working platform such that it will remain unchanged even if the platform is moved.

Finally, it is a particular advantage of the docking device according to the invention that a uniform engaging element 80 is formed, which is formed by the engaging elements 62, 64 which are provided in the partial shaft ends. In this way, a torque can be applied synchronously and consistently to both closing flaps by inserting an engaging element of the drive shaft corresponding to this uniform engaging element 80 when the closing flaps fitting tightly to each other by means of their external sides are pivoted. In contrast to conventional docking devices consisting of an active and a passive flap, this makes it possible to prevent the formation of a gap due to the one-sided application of a torque. Accordingly, force is exerted in a very consistent manner to the external sides of the closing flaps fitting tightly to each other in the docking devices according to the invention during the rotation process. Another advantage of the synchronous application of a torque to both closing flaps during the rotation process can be seen in that the drives can be made smaller than in conventional docking devices, in particular if the shafts are driven on both sides of the axis. In this way, it is possible to reduce the volume of the overall structure so that it will be easier to fit it into existing decanting equipment of the user. In addition, the working or docking platform is in this way particularly suited to be designed symmetrically, which has positive effects, in particular when the working platform is mounted elastically.

FIG. 19 shows a view of the front side of a drive shaft 54, including a complementary engaging element 58 which is provided on the front side 110 in the form of a substantially block-shaped projection. In contrast to the previous embodiments, the drive shaft 54 is provided with a cylinder-shaped attachment 94 as a second locking element in the area of the front side, which attachment surrounds the complementary engaging element 58. Of course the drive shaft 54 can itself have a diameter corresponding to the diameter of the cylinder-shaped attachment 94 so that the drive shaft and the cylinder-shaped attachment are provided as a unit, for example (indicated by the dotted line). Those skilled in the art will know suitable methods to manufacture any embodiment of such a drive shaft containing a cylinder-shaped attachment 94 in which a complementary engaging element is provided. As already explained above, the complementary engaging element 58 is intended to be inserted into the engaging elements 62, 64 of the first and the second coupling closure in order that the rotational motion of the drive shaft 54 can be transmitted to the tightly fitting closing flaps of the first and the second coupling closures.

Accordingly, FIG. 20 shows a partial view of first and second coupling closures 1 and 1' fitting tightly to each other and having corresponding partial shaft ends 16 and 16' which are also fitting tightly to each other and jointly form an (entire) shaft end 112. When the first and the second coupling closure are fitting tightly to each other, the engaging elements 62 and 62' provided in the form of grooves in these partial shaft ends form a continuous groove in the form of an entire engaging element 114 with which the complementary engaging element 58 of the drive shaft 54 can engage during axial motion. The partial shaft ends 16 and 16' are each provided with a contact or stop area 92 and 92', respectively, on their radial external side. In the shown embodiment, these radial contact areas 92 and 92', which are partial locking elements, form a first locking element 106 in the form of a cylinder-shaped, enveloping surface. These contact areas are shaped and dimensioned such that during axial relative motion of the drive shaft 54 and the shaft end 112 not only the complementary engaging element 58 provided in the form of a thorn engages with the groove 114, but also the cylinder-shaped attachment 94 of the drive shaft slides over the radial contact areas 92, 92' as a second locking element thus forming a locking unit 108 (see also FIGS. 21*a*) and *b*)). In this context, it has found to be advantageous that the inside diameter of the cylinder-shaped attachment 94 and the outside diameter of the contact areas 92, 92' or of the first locking element 106 are closely adapted to each other in order to enable axial relative motion without problems, but to disallow or prevent any movement in the radial direction. In this way, the first and the second coupling closures are locked against each other and can inevitably not be decoupled from each other during application of a torque by means of the drive shaft. This design of the docking device 66 according to the invention enables additional, external locking devices to be dispensed with wile ensuring a very high degree of operational safety.

FIGS. 21*a*) and 21*b*) show a schematic cross-sectional view illustrating the axial engagement of the complementary engaging element 58 of the drive shaft according to FIG. 19 with the entire engaging element 114, which is formed by the grooves 62 and 62', of the entire shaft end 112 of the docked coupling closures 1, 1' according to FIG. 20. The cylinder-shaped attachment or the cylinder-shaped sleeve 94 is adapted to the external radial contact or stop areas 92, 92' such that an accurate fit is achieved during axial motion. The sleeve 94 can be slid onto the shaft end 112. When the drive shaft 54 is in engagement with the entire shaft end 112, the coupling closures 1 and 1' can no longer be decoupled from each other. In order to facilitate insertion of the entire shaft end 114, the rim 96 of the cylinder-shaped sleeve is bevelled on the inside along the entire circumference. The partial shaft ends 16 and 16' are suitably provided with limit stops 98, 98' in each case, which stop the axial motion of the drive shaft during the engagement process. In this way, the front ends 116, 116' of the partial shaft ends can be prevented from directly contacting the front ends 110 of the drive shaft 54, and the front end of the complementary engaging element 58 can be prevented from contacting the front end of the engaging element 62, 62'.

Figure 21B:
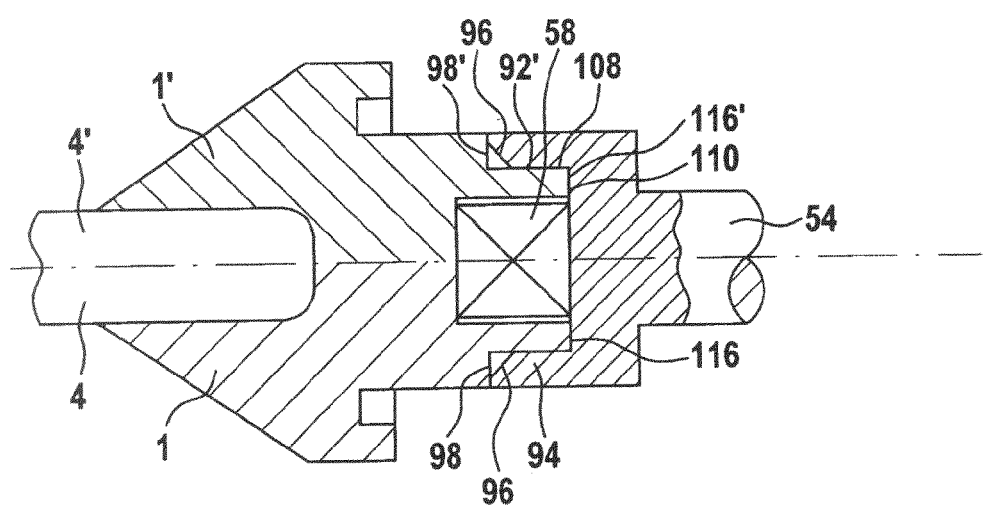
Figure 22B:
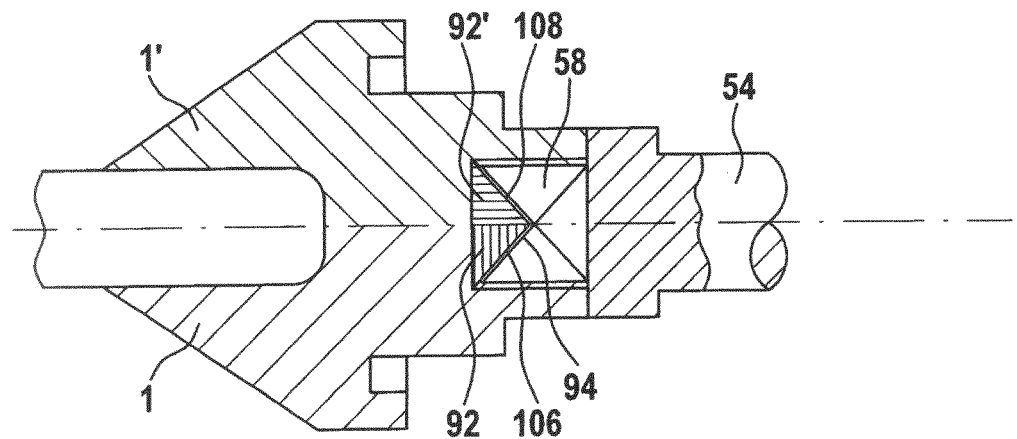

FIGS. 22*a*) and 22*b*) show a schematic cross-sectional view illustrating an alternative of locking the first and the second coupling closure 1, 1' against each other by interaction of the complementary engaging element 58 of the drive shaft 54 with the partial locking elements 92 and 92' of the engaging elements 62 and 62' of the first and the second coupling closure. In this embodiment, the front end of the complementary engaging element 58 is provided with an indentation 100 which is limited by a first contact area 102 and a second contact area 104. These contact areas form the second locking element 94. The first and the second contact areas 102, 104 are facing each other and are arranged at an angle α to each other. The engaging elements 62 and 62' of the first and the second coupling closure 1 and 1', respectively, are also provided with a partial locking element in each case and jointly form the first locking element 106 in the form of a wedge. The partial locking element 92 has a sloping contact area 108 which can contact the contact area 104 of the complementary engaging element 58 during axial motion of the drive shaft 54, while the partial locking element 92' has a similar contact area 106' sloping inversely which can contact the first contact area 102 of the complementary engaging element 58 during this axial motion. Due to the forces exerted on the locking elements 92 and 92' or the contact areas thereof by means of the contact areas 102 and 104 during axial motion, the first and the second coupling closure are pressed against each other or locked against each other thus forming a locking unit 108 (see also FIG. 22 *b*)). In this context, it is particularly advantageous that the partial locking elements 92 and 92' or the first locking element 106 and the indentation 100 or the first and the second contact area 102 and 104 or the second locking element 94 are dimensioned and adapted to each other such that neither the continuous rim of the indentation 100 nor the part of the locking elements 92 and 92' projecting furthest into the indentation 100 limit the axial motion during engagement, but that this is effected solely by means of the contact of the first and the second contact areas 102 and 104 with the corresponding contact areas of the partial locking elements 92 and 92'. In the way described above with reference to FIGS. 22*a*) and 22*b*) it is also possible to press or lock the first and the second coupling closures against each other and hold them locked or pressed against each other during the rotation process of the closing flaps without any need of external, additional locking elements. Of course it is also possible to combine the embodiments of the complementary locking elements shown in FIGS. 21 and 22 and described above. In this way, the coupling closures of the docking devices would be locked or pressed against each other by the synchronous formation of two locking units.

For more clarity, all coupling closures and docking systems illustrated in the figures are shown without the containers connected to the coupling closure or the nozzle stub of the coupling closure on the container side thereof.

The features of the invention disclosed in the above description, in the claims and in the drawings can be essential for the realization of the invention in its various embodiments, both individually and in any desired combination.

LIST OF REFERENCE NUMERALS

1 Coupling closure
2 Nozzle stub
4 Closing flap
6 Nozzle stub seal
8 External side of the closing flap
10 Circumferential rim of the closing flap
12 Seal of the closing flap
13*a*) and *b*) Sealing sections
14 Groove
16 Shaft end
18 Shaft end
20 Bearing shell
22 Bearing shell
24 Wedge-shaped attachment
26 Wedge-shaped attachment
27 Closure side
28 Equipment side
30 Projection on the external side of the nozzle stub
31 Projection on the external side of the nozzle stub
32 Docking platform
34 Passage
36 Insertion device
38 Insertion device
40 Limit stop
42 Limit stop
44 Drive
46 Drive
48 Shaft bearing
50 Shaft bearing
52 Support rim
54 Drive shaft
56 Drive shaft
58 Complementary engaging element
60 Complementary engaging element
62 Engaging element
64 Engaging element
66 Docking device
68 Locking unit
70 Locking unit
72 Device mounted to be pivotable
74 Roller
75 Roller
76 Guide and support element
77 Indentation to receive the guide element
78 Support extension
80 Uniform engaging element
82 (Entire) shaft formed by partial shafts 16, 16'
84 (Entire) shaft formed by partial shafts 18, 18'
86 Insert for bearing shell
88 (Entire) bearing formed by bearing shells 20, 20'
90 (Entire) bearing formed by bearing shells 22, 22'
92 Partial locking element
94 Cylinder-shaped attachment
96 Bevelled inner rim of the cylinder-shaped attachment
98 Limit stop of the partial shaft end for the rim of the cylinder-shaped attachment
100 Indentation
102 First contact area
104 Second contact area
106 First locking element
108 Locking unit
110 Front end of the drive shaft
112 (Entire) shaft end
114 Entire engaging element
116 Front end of the partial shaft ends
$\alpha$ Angle between the first and the second contact area

The invention claimed is:

1. A coupling closure for a docking device for decanting, filling, and/or emptying containers, having a closure side and a container side, comprising a nozzle stub and a closing flap which is mounted therein so as to be pivotable about an axis and which has an external side that faces the closure side in a closed position,
wherein at least one side of the closing flap is arranged on a bearing, which is open towards the closure side along the axis with a partial shaft or a partial shaft end, wherein the partial shaft or partial shaft end forms, in arrangement with a complementary partial shaft or partial shaft end of another coupling closure, a shaft or a shaft end, wherein the partial shaft or partial shaft end has at least one engaging element in form of a groove in which a complementary engaging element in effective connection with a drive can be inserted, wherein the at least one engaging element is formed in such a manner that it is suitable for load transmission and for pivoting the closing flap, and wherein the at least one partial shaft or partial shaft end is connected to or present with the closing flap in one piece.

2. The coupling closure according to claim 1, wherein the partial shaft or partial shaft end has a front end in axial direction, in or on which the engaging element is present, which can be inserted axially into the complementary engaging element.

3. The coupling closure according to claim 1, wherein the closing flap on its external side has at least one sealing section or at least one seal which is arranged, at least in sections, on or close to the edge of a circumferential rim.

4. The coupling closure according to claim 1, wherein the nozzle stub has a nozzle stub seal at least in part of its interior.

5. The coupling closure according to claim 1, wherein at least one partial shaft or partial shaft end on its side facing the closure side has recesses for the engagement of the complementary partial shaft or partial shaft end in the form of a semi-shaft, at least in sections.

6. The coupling closure according to claim 1, further comprising a container or a conveyance, which can be, or which is, tightly connected to the nozzle stub.

7. The coupling closure according to claim 1, further comprising limit stops on side faces of the nozzle stub, adjacent to at least one bearing.

8. The coupling closure according to claim 1, wherein the engaging element and/or the partial shaft or partial shaft end comprises at least one partial locking element suitable for forming a first locking element with a partial locking element of a corresponding coupling closure.

9. The coupling closure according to claim 1, wherein the closing flap has, along the pivotable axis, a second partial shaft or a second partial shaft end wherein the second partial shaft or partial shaft end has at least one engaging element in which a complementary engaging element in effective connection with a drive can be inserted.

10. A docking device for decanting, filling, and/or emptying containers, comprising first and second coupling closures according to claim 1, which can be, or which are, placed next to each other closely by their respective closure sides, wherein the external sides of the respective closing flaps are, or can be, placed next to each other closely and can be pivoted, while being placed closely next to each other, from a closing position, in which they close a transfer channel formed by the nozzle stub of the first coupling closure and the nozzle stub of the second coupling closure, about a common axis into an open position.

11. The docking device according to claim 10, wherein a first partial shaft or first partial shaft end of the first coupling closure and a complementary first partial shaft or first partial shaft end of the second coupling closure form a first shaft or a first shaft end, and a second partial shaft or second partial shaft end of the first coupling closure and a complementary second partial shaft or second partial shaft end of the second coupling closure form a second shaft or a shaft end, wherein at least the first or second partial shaft or at least the first or second partial shaft end of the first or second coupling closure has at least one engaging element in which a complementary engaging element in effective connection with a drive can be inserted.

12. The docking device according to claim 11, wherein the engaging elements of the complementary first partial shafts or partial shaft ends of the first and second coupling closures, while fitting closely, form a uniform engaging element, and wherein the engaging elements of the complementary second partial shafts or partial shaft ends of the first and second coupling closure, while fitting closely, form a uniform engaging element, in each case suitable for receiving a complementary uniform engaging element.

13. The docking device according to claim 12, wherein the uniform engaging element of the mutually fitting first partial shafts or first partial shaft ends and/or the uniform engaging element of the mutually fitting second partial shafts or partial shaft ends form the complementary uniform engaging element.

14. The docking device according to claim 10, wherein the bearings of the first and second coupling closures are comprised of a set of bearing shells, and wherein the partial shafts or partial shaft ends of the first and second coupling closures are pivotable about the common axis while forming a shaft or a shaft end in the bearings formed by the bearing shells.

15. The docking device according to claim 10, further comprising at least one guide device for at least one partial shaft or partial shaft end of at least one closing flap.

16. The docking device according to claim 10, wherein the engaging elements of the partial shafts or partial shaft ends, which form the shaft or shaft end, form a uniform engaging element for a corresponding engaging element of a drive shaft.

17. The docking device according to claim 10, further comprising at least one drive shaft or a shaft which can be brought in effective connection with a drive, which has at least one engaging element that is complementary to at least one engaging element of the first or second coupling closure so that the closely fitting closing flaps are pivotable about the drive, when these complementary engaging elements engage with each other.

18. The docking device according to claim 17, further comprising at least one drive which is in effective connection with the at least one drive shaft.

19. The docking device according to claim 10, wherein the closing flaps of the first and second coupling closures each have at least one seal, and wherein the seals of the closing flaps of the first and the second coupling closure protrude from their external sides only in sections in each case, wherein these sections of the seals of the first and the second coupling closure form an essentially continuous circumferential seal when the external sides of the closing flaps are closely fitting.

20. The docking device according to claim 10, wherein the nozzle stubs of the first and the second coupling closure have points of exertion for force to act on, by which, in a coupled state, the external sides of the first and the second coupling closure can be pressed against each other and/or the nozzle stubs of the first and the second coupling closure can be locked against each other reversibly.

21. The docking device according to claim 20, further comprising a locking unit by which force can be exerted on the respective points of exertion of the first and the second coupling closure from essentially opposing directions.

22. The docking device according to claim 10, further comprising a working platform on which at least one drive, at least one locking unit, and at least one shaft bearing for a drive shaft are mounted.

23. The docking device according to claim 22, wherein the nozzle stub of the first and/or the second coupling closure comprises within the range of the partial shafts or partial shaft ends at least one limit stop and/or at least one guide device for the shaft bearing of the drive shaft or the drive.

24. The docking device according to claim 10, wherein the nozzle stub of the first coupling closure is connected, or can be connected, tightly with a first container and/or conveyance, and the nozzle stub of the second coupling closure is connected, or can be connected, tightly with a second container and/or conveyance.

25. The docking device according to claim 22, wherein the engaging elements and/or the partial shafts or partial shaft ends of the first and the second coupling closure each comprise at least one partial locking element suitable for forming a first locking element, wherein the complementary engaging element or the drive shaft comprise a second locking element which corresponds to the first locking element, and wherein by relative motion of the first and the second locking element towards each other the locking unit can be formed, whereby the first and the second coupling closures can be pressed and/or locked against each other.

26. The docking device according to claim 10,
wherein a front end of the complementary engaging element comprises first and second contact areas which are facing each other at an angle, wherein during an axial relative motion of the complementary engaging element for engaging the engaging elements of the first and the second coupling closure, the first contact area of the complementary engaging element is brought in contact with the engaging element of the first coupling closure and the second contact area of the complementary engaging element is brought in contact with the engaging element of the second coupling closure, whereby the first and the second coupling closures can be pressed and/or locked against each other; or wherein the partial shafts or partial shaft ends of the first and the second coupling closure have a stop face that, at least in part, is radial in respect of the axis of rotation as partial locking elements which, while forming a first locking element, face at least in part away from each other and to the respective container side of the coupling closure, and wherein the complementary engaging element has, as a corresponding second locking element, contact area sections at a front end, which are radial in respect of the axis of rotation, essentially opposing each other and facing each other at least in part, by which the stop faces of the first and the second coupling closure can be pressed and/or locked against each other due to interaction with these stop faces when engaging the engaging elements of the first and the second coupling closure with the complementary engaging element.

27. A docking platform for a docking device according to claim 10 for the transfer of bulk material in an environmentally isolated manner, the docking platform comprising:
   at least one coupling closure;
   at least one drive mounted on the docking platform;
   a passage in the docking platform for a coupling closure of the docking device;
   at least one locking unit for locking and/or pressing against each other the external sides of closing flaps of docked coupling closures of the docking device; and
   at least one shaft bearing for a drive shaft, which is in effective connection with the drive.

28. A docking platform for a docking device according to claim 10, the docking platform comprising:
   at least one drive mounted on the platform;
   a passage in the platform for a coupling closure of the docking device;
   at least one locking unit for locking and/or pressing against each other the external sides of closing flaps of docked coupling closures of the docking device; and
   at least one shaft bearing for a drive shaft which is in effective connection with the drive.

29. A method for decanting, filling, and/or emptying containers, comprising:
   providing a first coupling closure according to claim 1, wherein the first coupling closure is connected to a first container, and wherein the closing flap of the first coupling closure is in the closed position;
   providing a second coupling closure according to claim 1, wherein the second coupling closure is connected to a second container, and wherein the closing flap of the second coupling closure is in the closed position;
   coupling the first coupling closure with the second coupling closure at their respective closure sides and forming a docking device according to claim 10;
   establishing an effective connection of a drive shaft of a drive with the shaft of the docking device by engaging the engaging element of the shaft of the docking device with a complementary engaging element of the drive shaft;
   moving the closely fitting closing flaps from the closed position to a position which releases the transfer channel at least partly by actuating the drive;
   transferring bulk material from the first container to the second container, or vice versa;
   moving the closely fitting closing flaps to the closed position by actuating the drive; and
   decoupling the first and the second coupling closure while detaching the docking device.

30. A locking unit suitable for locking two nozzle stubs of coupling closures according to claim 1, comprising a body with a closure side which can be rotated about an axis, wherein the closure side of the body has at least one first projecting element and at least one second projecting element, wherein the first and the second projecting elements are at least in part in a plane that is essentially angular to the axis of rotation, wherein the distance of the first projecting element and the second projecting element to the axis of rotation is in each case smaller than the distance of the first and the second element to each other, and wherein the first and the second elements can be brought from a locking position to an open position and vice versa by rotation of the body about the axis of rotation.

* * * * *